US011889875B2

(12) United States Patent
Beyeler

(10) Patent No.: US 11,889,875 B2
(45) Date of Patent: Feb. 6, 2024

(54) ACCELERATION PROTECTION TROUSERS

(71) Applicant: Patrick G. Beyeler, Arzier-le Muids (CH)

(72) Inventor: Patrick G. Beyeler, Arzier-le Muids (CH)

(73) Assignee: Patrick G. Beyeler, Arzier-le Muids (CH)

( * ) Notice: Subject to any disclaimer, the term of this patent is extended or adjusted under 35 U.S.C. 154(b) by 0 days.

(21) Appl. No.: 17/312,479

(22) PCT Filed: Aug. 25, 2020

(86) PCT No.: PCT/EP2020/073772
§ 371 (c)(1),
(2) Date: Jun. 10, 2021

(87) PCT Pub. No.: WO2021/043640
PCT Pub. Date: Mar. 11, 2021

(65) Prior Publication Data
US 2022/0183405 A1   Jun. 16, 2022

(30) Foreign Application Priority Data

Sep. 4, 2019 (CH) .................................... 0111519
Apr. 3, 2020 (CH) .................................... 0040420

(51) Int. Cl.
*B64D 10/00* (2006.01)
*A41D 13/05* (2006.01)
(52) U.S. Cl.
CPC ......... *A41D 13/0543* (2013.01); *B64D 10/00* (2013.01); *B64D 2010/002* (2013.01)
(58) Field of Classification Search
CPC ..... B64D 2010/002; B64D 10/00; B64G 6/00
(Continued)

(56) References Cited

U.S. PATENT DOCUMENTS 2,475,479 A * 7/1949 Schroeder .............. B64D 10/00
600/20
4,752,300 A * 6/1988 Johnson .................... D06P 3/54
427/393.3
(Continued)

FOREIGN PATENT DOCUMENTS

DE    102007053236 A1    5/2009

OTHER PUBLICATIONS

International Search Report and Written Opinion of PCT/EP2020/073772 dated Nov. 9, 2020.
(Continued)

*Primary Examiner* — Samuel G Gilbert
(74) *Attorney, Agent, or Firm* — Polsinelli PC

(57) ABSTRACT

Acceleration protective trousers or G-protective trousers are double-walled forming airtight compartments. The trousers include an air-permeable, tear-resistant, fire-resistant and low-stretch synthetic textile material, and the trousers are provided with compartments which can be inflated into a circular cross-section. These compartments act as muscles by two opposite edges being pulled together and the adjacent pieces of textile material being stretched. These compartments extend along the trouser legs and are connected at the upper end of the trouser legs. The compartments on the outer sides of the trouser legs extend upwards from the groins and terminate in a bag-like bladder towards the lower abdomen. On the rear side of the trousers they communicate with one another via a connecting channel. A coccyx channel branches off downwards and extends towards the crotch. The compartments communicate via at least one hose with raccord with an automatically meterable compressed air supply.

13 Claims, 30 Drawing Sheets

Figure 1:
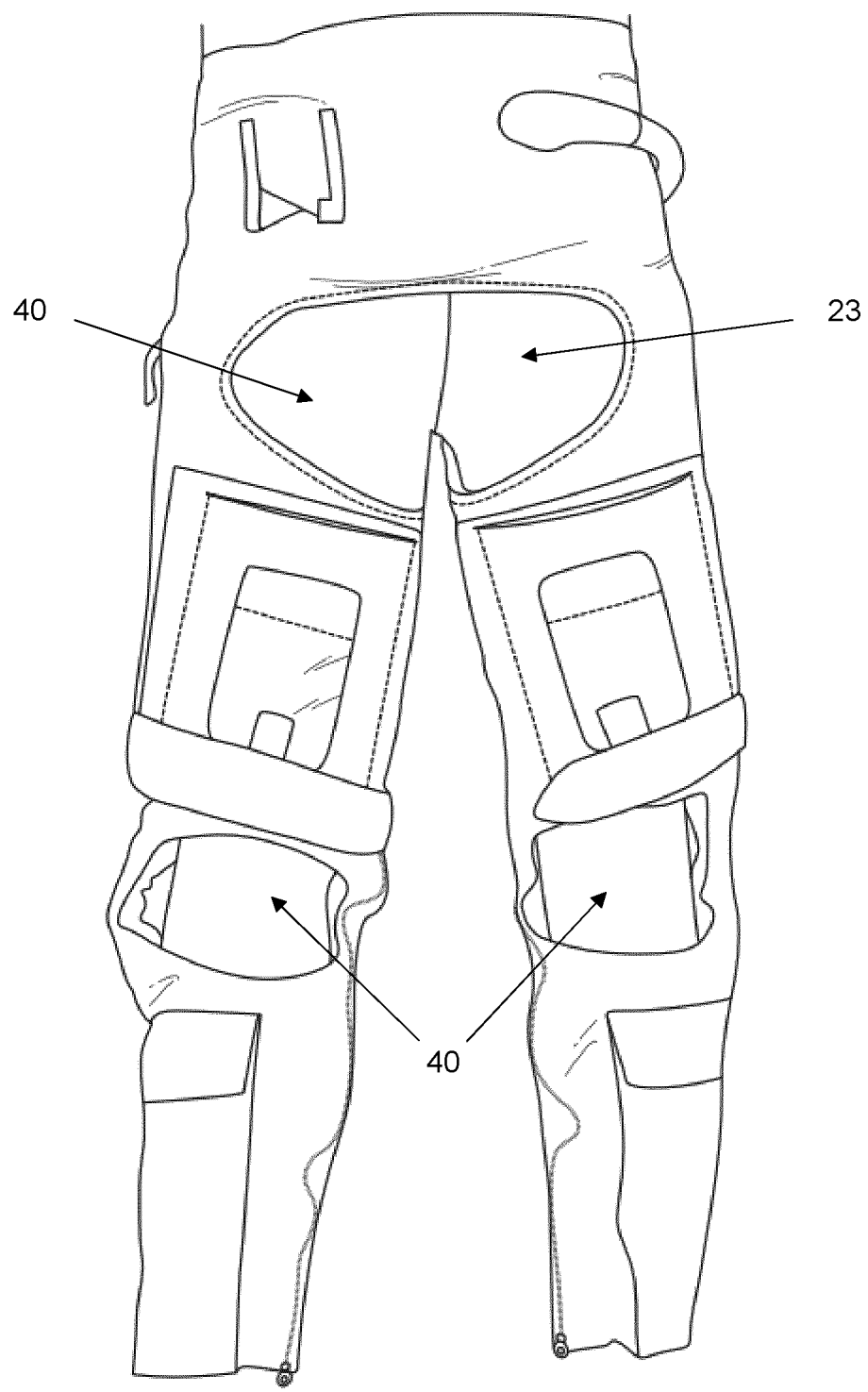

(58) Field of Classification Search
USPC .......................................................... 600/20
See application file for complete search history.

(56) References Cited

U.S. PATENT DOCUMENTS 5,394,563 A * 3/1995 Doyle .................... B64D 10/00
139/420 R
5,537,686 A * 7/1996 Krutz, Jr. ............... B64D 10/00
2/2.14

OTHER PUBLICATIONS

International Preliminary Report on Patentability for PCT/EP2020/073772 dated Mar. 30, 2020.
English Translation of International Preliminary Report on Patentability for PCT/EP2020/073772 dated Mar. 30, 2020.
International Search Report and Written Opinion with English Inserts of PCT/EP2020/073772 dated Mar. 30, 2020.

* cited by examiner

ACCELERATION PROTECTION TROUSERS

CROSS-REFERENCE TO RELATED APPLICATIONS

This application is a national stage application of International Application Number PCT/EP2020/073772, which was filed on Aug. 25, 2020, which claims priority to Switzerland Application Number 00404/20 filed on Apr. 3, 2020 and 01115/19 filed Sep. 4, 2019, each of which is incorporated by reference in its entirety.

The present invention relates to acceleration protective trousers, or, in short, G-protective trousers, instead of a conventional full G-suit for the crew of high-performance aircraft.

High acceleration forces can occur when flying turns. For the pilot's organism, with positive g-forces along the vertical axis, this means that the blood from the upper regions of the body sags downwards. Then, the heart has to perform better for a sufficient supply of blood and therefore oxygen to the brain and eyes. However, if its—individually different—capacity limits are exceeded, the lack of oxygen can lead to impaired vision (tunnel vision, greyout) or even to a complete loss of consciousness (blackout) (g-induced loss of consciousness—G-LOC) and thus to a mission abort and/or to accidents. High g-forces occur, for example, in flight races, aerobatics and military flight profiles (aerial combat, interception maneuvers after the use of weapons, etc.). To a certain extent, aircraft crews can suppress or delay the negative effects of high g-loads. In addition to appropriate training, they can achieve this through targeted muscle tension or pressure breathing, for example. These measures are supported by technical solutions such as inclined seats, press ventilation with oxygen-enriched air and anti-g-suits or a combination of these options. Ultimately, however, restrictions in performance and ability to act and rapid exhaustion cannot be completely prevented.

G protective suits are known in various designs. A distinction is made between those that are exposed to air as pressure fluid, i.e. so-called pneumatic G protective suits and those that work according to the hydrostatic principle, and either allow the hydrostatic pressure to act directly on the wearer of the protective suit, or those suits which are provided with liquid veins which run essentially in the local and instantaneous Z-axis and increase the internal pressure corresponding to the liquid column by shortening the circumference of the protective suit around the limbs. These are both simply called hydrostatic G protective suits, although the liquid is by no means limited to water. Known G protective suits are described, for example, in EP 1 755 948, which is probably the closest prior art, and also in US 2007/0289050, JP 2008012958 and DE 102007053236. Furthermore, a G protective suit has become known from WO2012/066114 A1.

In such G protective suits, the body regions and/or body parts to be protected are usually surrounded by the G protective suit or parts thereof. The body parts and regions, which are particularly stressed by the often extreme accelerations, are put under pressure within such G protective suits by compressed air or gas pressurized bubbles or hoses depending on the accelerations in the current and local Z-axis, called Gz the pilot's hemostatic pressure is counteracted. This is the general task of such G protective suits.

The effort for a sufficient G-protection is still considerable with conventional suits and it is the aim of this invention to reduce this effort especially by the fact that a sufficient G-protection is achieved with G-protective trousers alone instead of a complete suit. These protective G-trousers should provide sufficient G-protection for applications that make up about a third of the entire relevant market. The entire market is taken into account, i.e. not just the market for solutions for high-performance combat aircraft alone, but also that for less demanding applications, for example for use in jet trainers and, more generally, in aircraft in which similar accelerations occur. This acceleration or G protective trousers should be effective under all circumstances and in all conditions without any special behavior on the part of the pilot, as is necessary with conventional G-suits, especially in the limit range.

Conventional G protective suits are relatively heavy and stiff, and the wearer easily sweats in them, which negatively affects their natural G tolerance and well-being. Some G-suits can cause foot and arm pain in the wearer, and there are general medical doubts concerning the pressure breathing under G (PBG) they induce. G-protective trousers should therefore ensure absolutely reliable G-protection, i.e. the prevention of so-called G-LOC, and ensure this G-protection with as little effort as possible, if possible without making breathing under overpressure necessary. The G protective trousers should function without any influence from the wearer, that is to say without pressured breathing, that is to say without Anti G Straining Maneuvers "(AGSM) so that it does develop its optimal effect in all situations and does offer the highest possible wearing comfort, and be almost as comfortable to wear as underwear. This is intended to prevent the pilot from getting tired prematurely and reliably prevent pain. In addition, these G-protective trousers should also provide buoyancy support when immersing in water. Optionally, the G protective trousers should include an active cooling device. It should be possible to manufacture these G-protective trousers as standard trousers. The tailoring of such G-protective trousers for individual wearers, as was previously mostly necessary for suits, should no longer be necessary.

Since the contact pressure has so far been generated by the shell of a G protective suit on the wearer's body, depending on the part of the body to be protected, the sizes of the bubbles that cause these contact pressures are different. As can be seen from the prior art documents, the volumes of the bubbles are relatively large, up to almost full coverage of the lower body, which, in conjunction with the compressibility of air and taking into account the high onset rates of Gz, leads to a slowed reaction of the G protective suits leads.

The object of the present invention, taking into account the facts set out above, is to create acceleration protective trousers or G protective trousers by means of which the internal pressure can be controlled according to the relative size of the body to be protected and according to the local and instantaneous acceleration, and furthermore, the volumes to be filled for this purpose should remain small. The G-protective trousers should also be comfortable to wear without requiring a precise fit. It should be easy to put on and take off, comparable to putting on normal jeans trousers, and make the overpressure breathing required in a G-suit unnecessary. In addition, it should offer additional functions such as air conditioning in optional versions. Another task of these protective G-trousers is to facilitate the venous return of the blood in the pilot's legs by changing the internal pressure generated in a rhythmic manner. These protective G trousers should also not change the position of the pilot's hand on the thigh when inflating under G loads, as no pressure bubbles are positioned on the thigh. Eurofighters, F/A-18s and other aircraft have a central control stick, and pilots often place their control arm on their thighs to provide long-term support or to facilitate regular flight in a long turn. Ultimately, these protective G-trousers should also be able to be worn over an aviator's suit and even be able to slip over the aviator boots to put them on. For this purpose, it should be specially equipped so that it can be put on effortlessly, easily and quickly and taken off again with the aviator suit and the aviator boots already on, i.e. it should be able to be slipped over the aviator boots so that they can be put on and taken off can be.

The solution to the task at hand is achieved by acceleration protective trousers or G-trousers for pilots of aircraft in which high accelerations occur, whereby at least parts of the G-protective trousers being double-walled and thus forming airtight compartments on the inside or outside, which can be subjected to acceleration-dependent air pressures and which are characterized in that the G-protective trousers consist entirely of an air-permeable, tear-resistant, fire-resistant and low-stretch synthetic textile, and the G-protective trousers are partly equipped with compartments that can be inflated over an outwardly leading hose with raccord for connection to an automatically metered compressed air supply, and which can be inflated into an approximately circular cross-section, so that these compartments act as muscles, as their two opposite edges can be pulled together and the adjacent pieces of fabric can thus be stretched, and whereby these compartments extend continuously along the inside and outside of the fin legs and are connected at the upper end of the trouser legs via a groin channel running along the lower area of the lasts, and the compartments on the outsides of the trouser legs extend further upwards from the lasts and towards the lower abdomen in to a sack-like bladder, while they communicate with one another via a connecting channel on the back of the trousers, in the area of the wearer's small of the back, and from there a coccyx channel branches down and extends between the buttocks of the wearer in the direction of the crotch, whereby the compartments communicate via at least one hose with raccord with an automatically metered compressed air supply.

In the dependent claims, particularly advantageous designs of these protective G trousers are claimed in a more precise form.

These protective G-trousers and the underlying concept of the invention are explained in more detail with the aid of the drawings.

Figure 2:
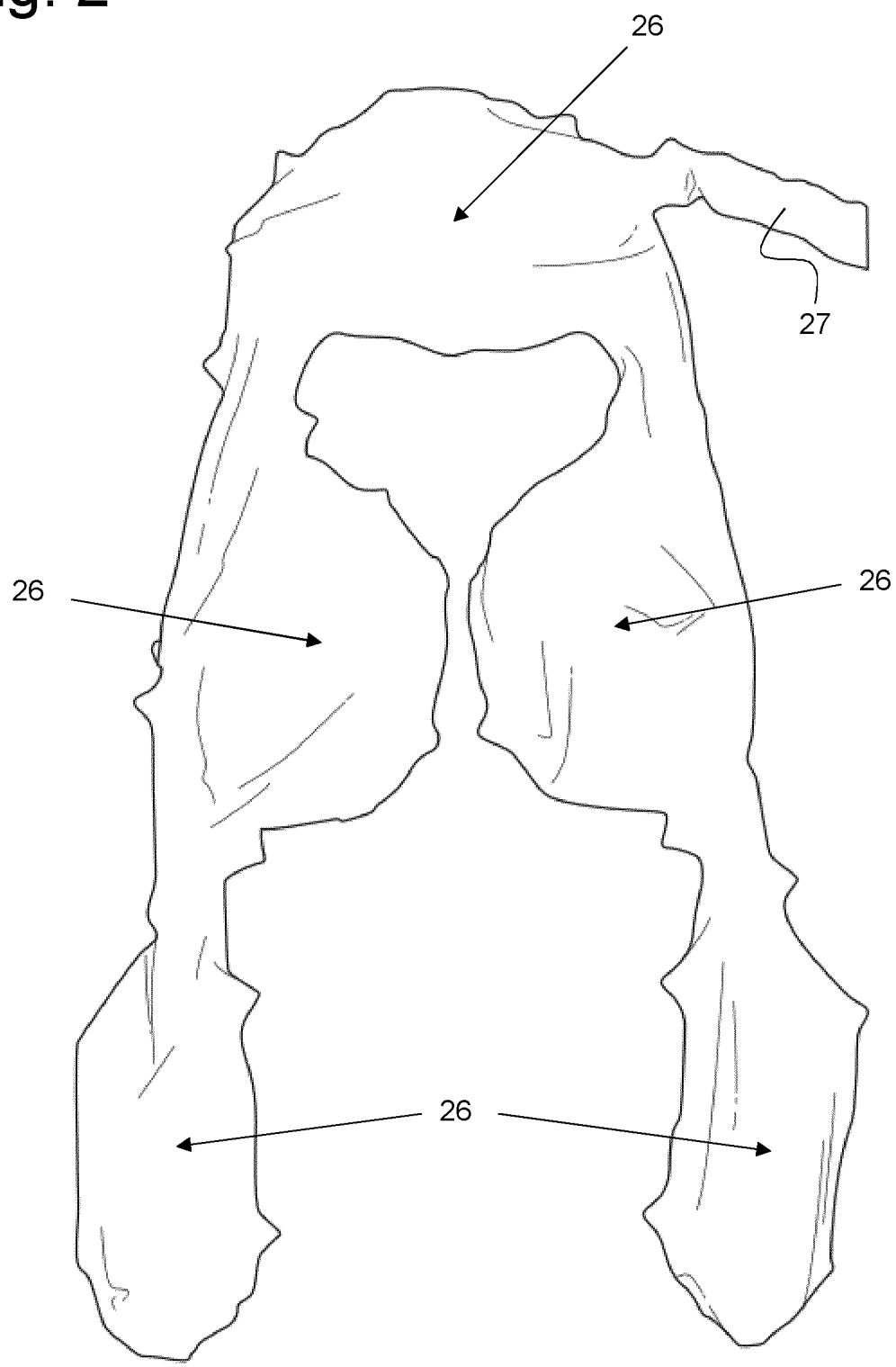
Figure 3:
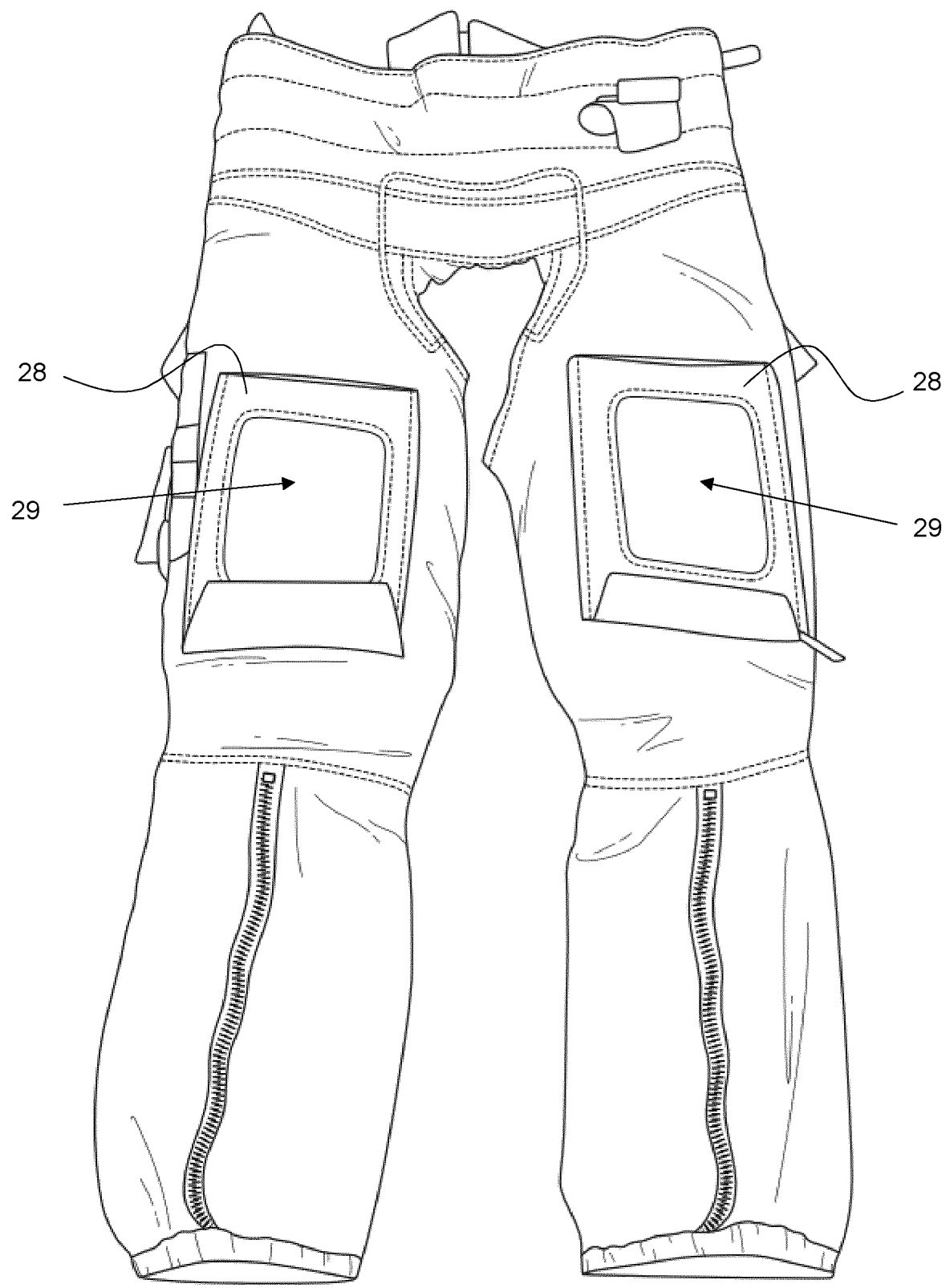
Figure 4:
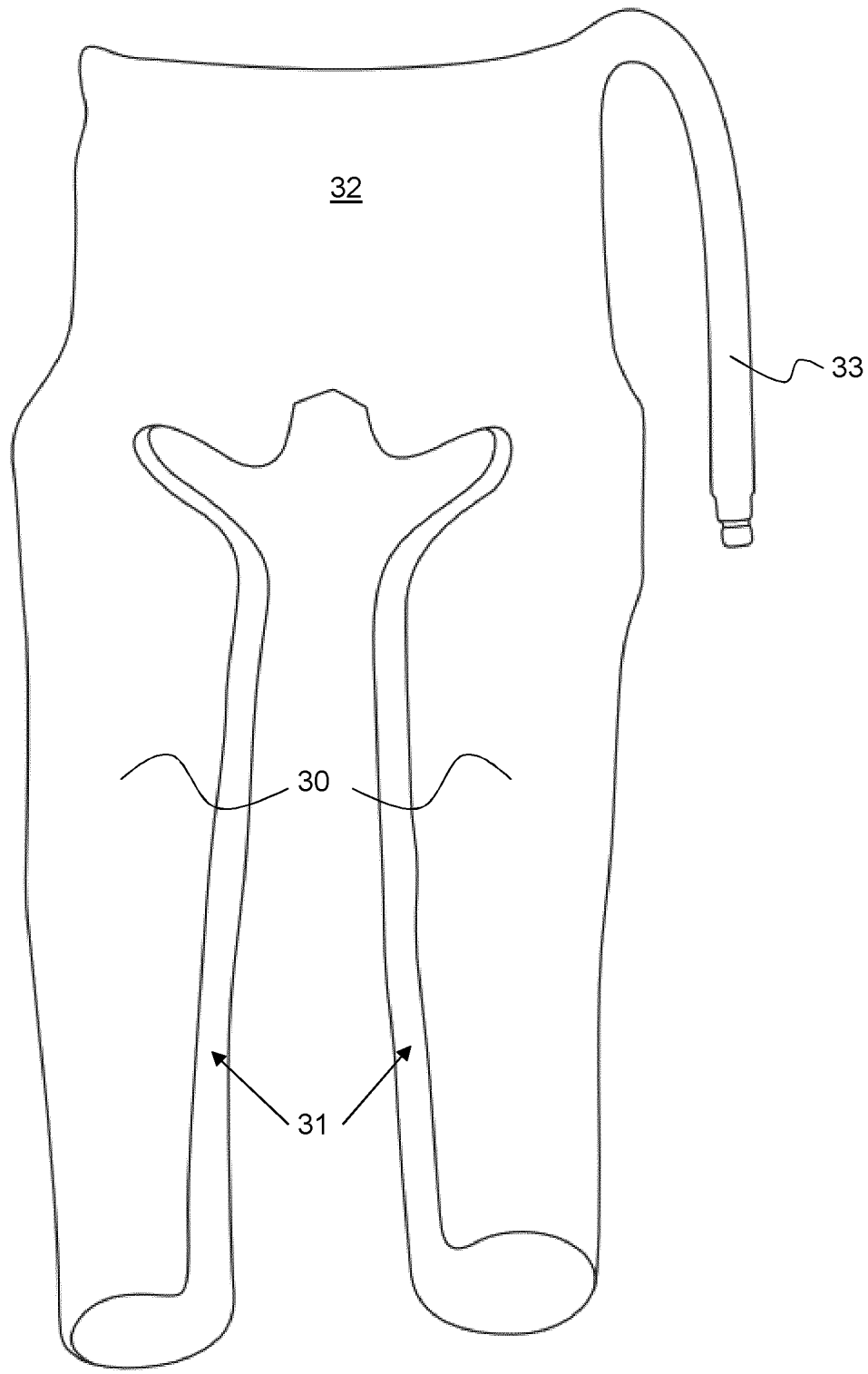
Figure 5:
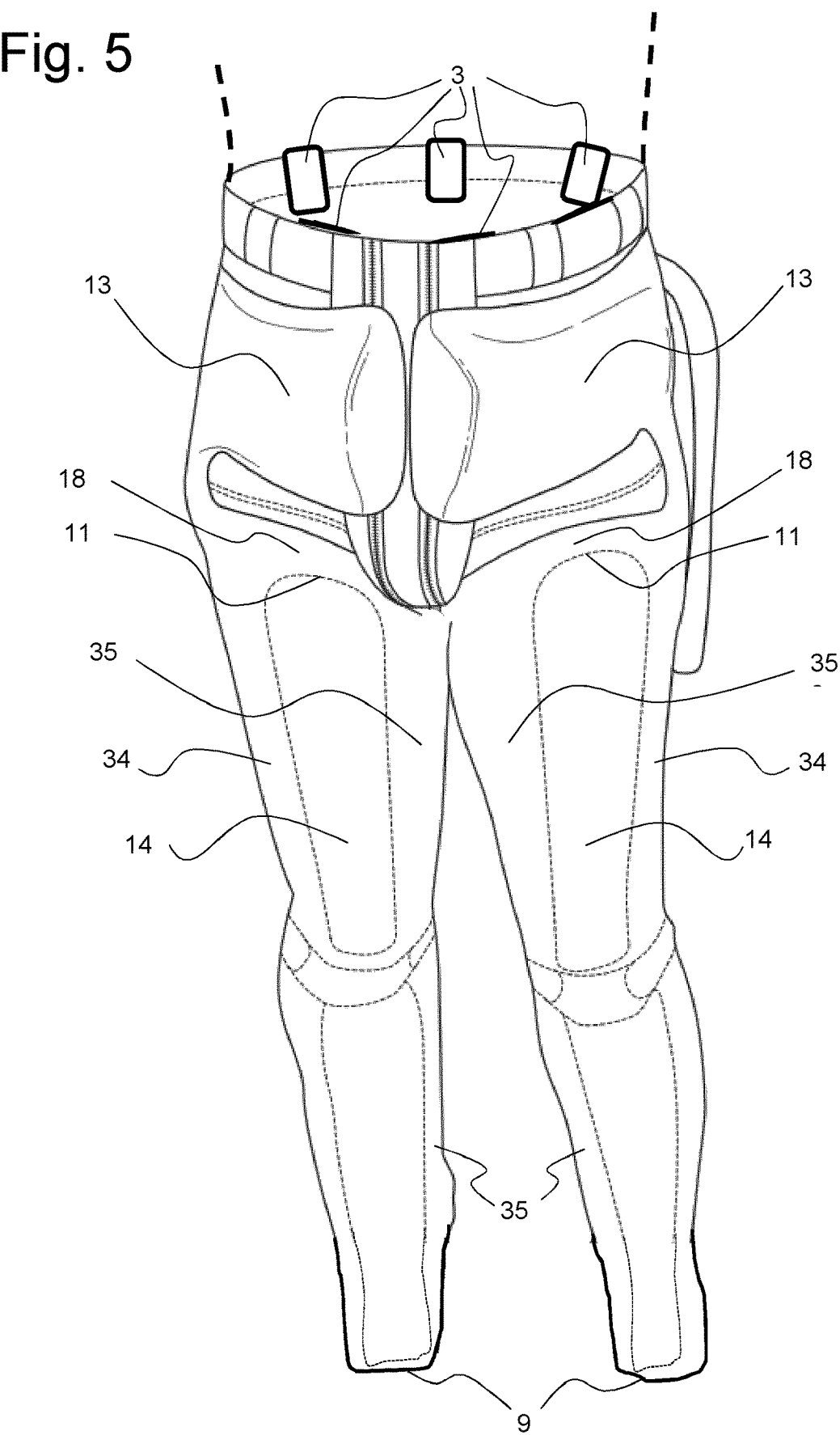
Figure 6:
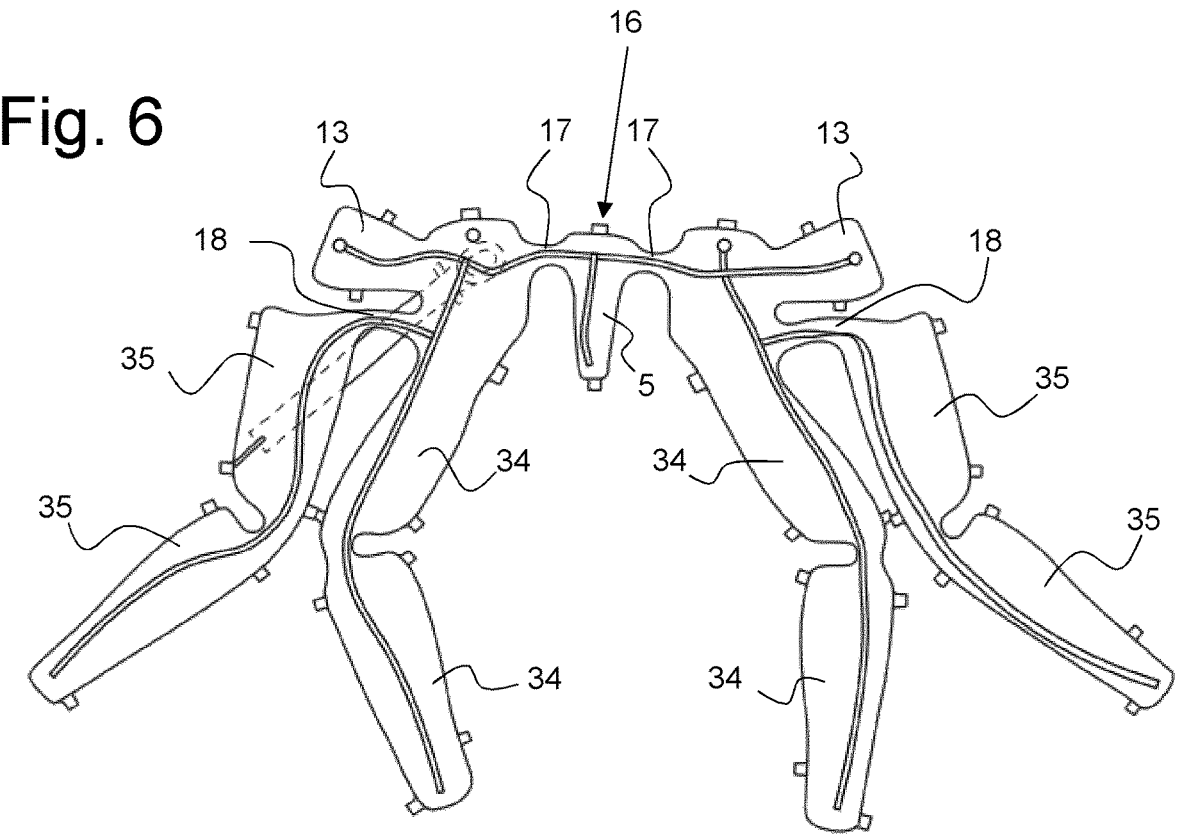
Figure 7:
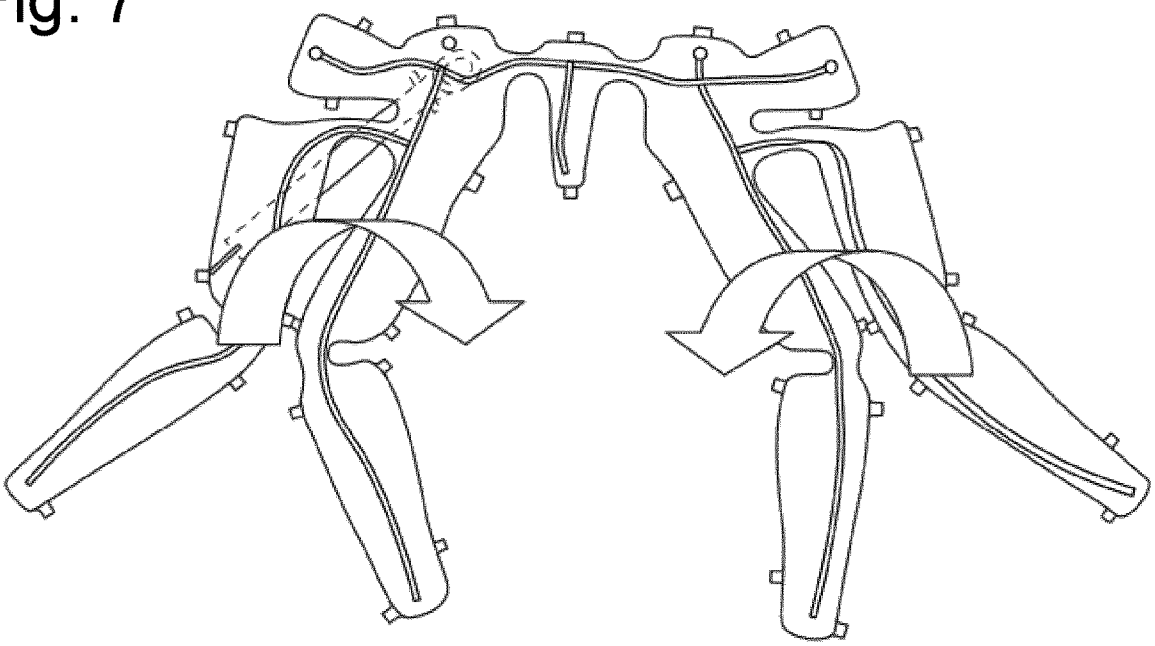
Figure 8:
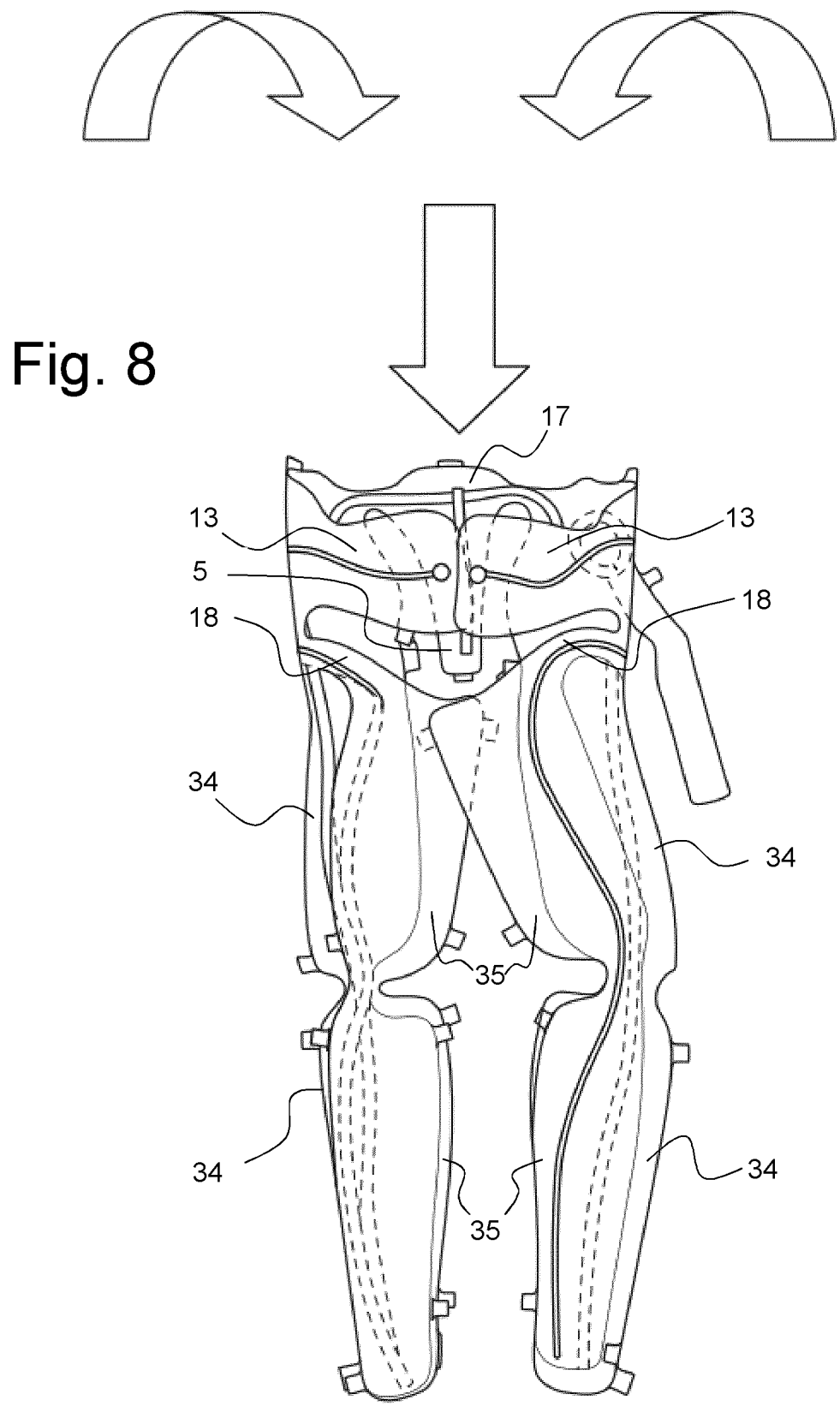
Figure 9:
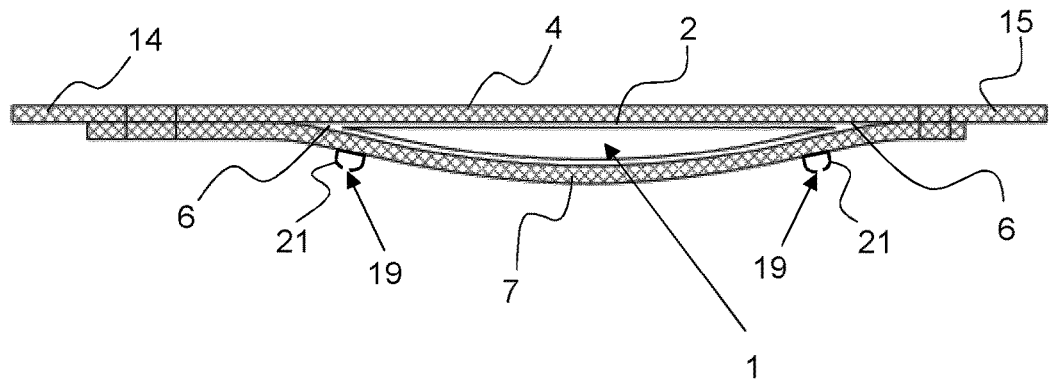
Figure 10:
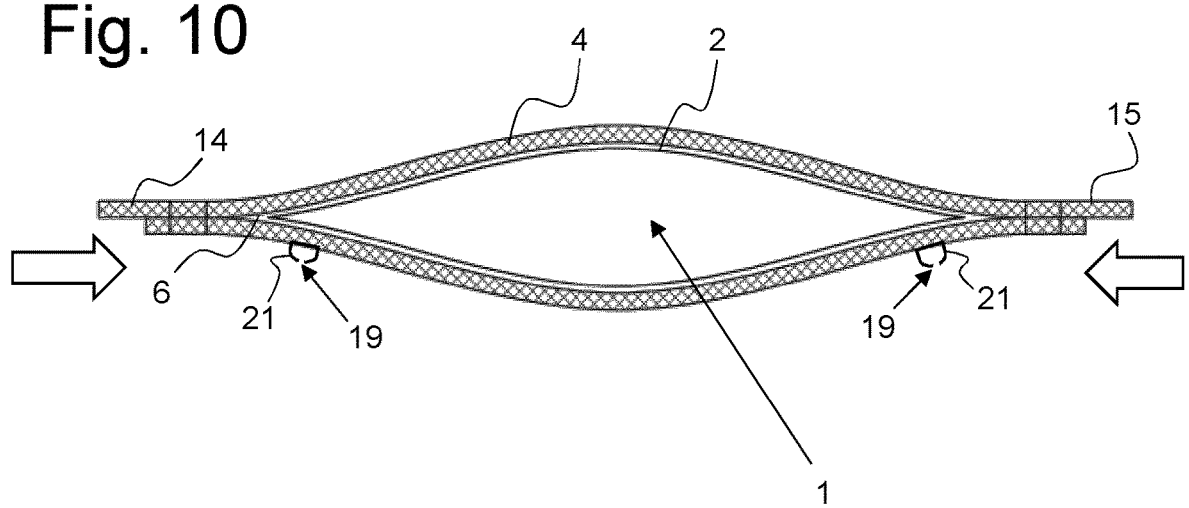
Figure 11:
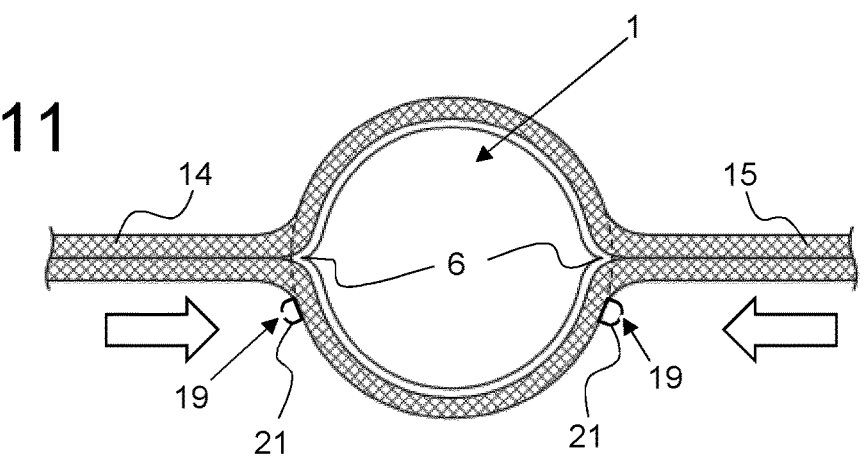
Figure 12:
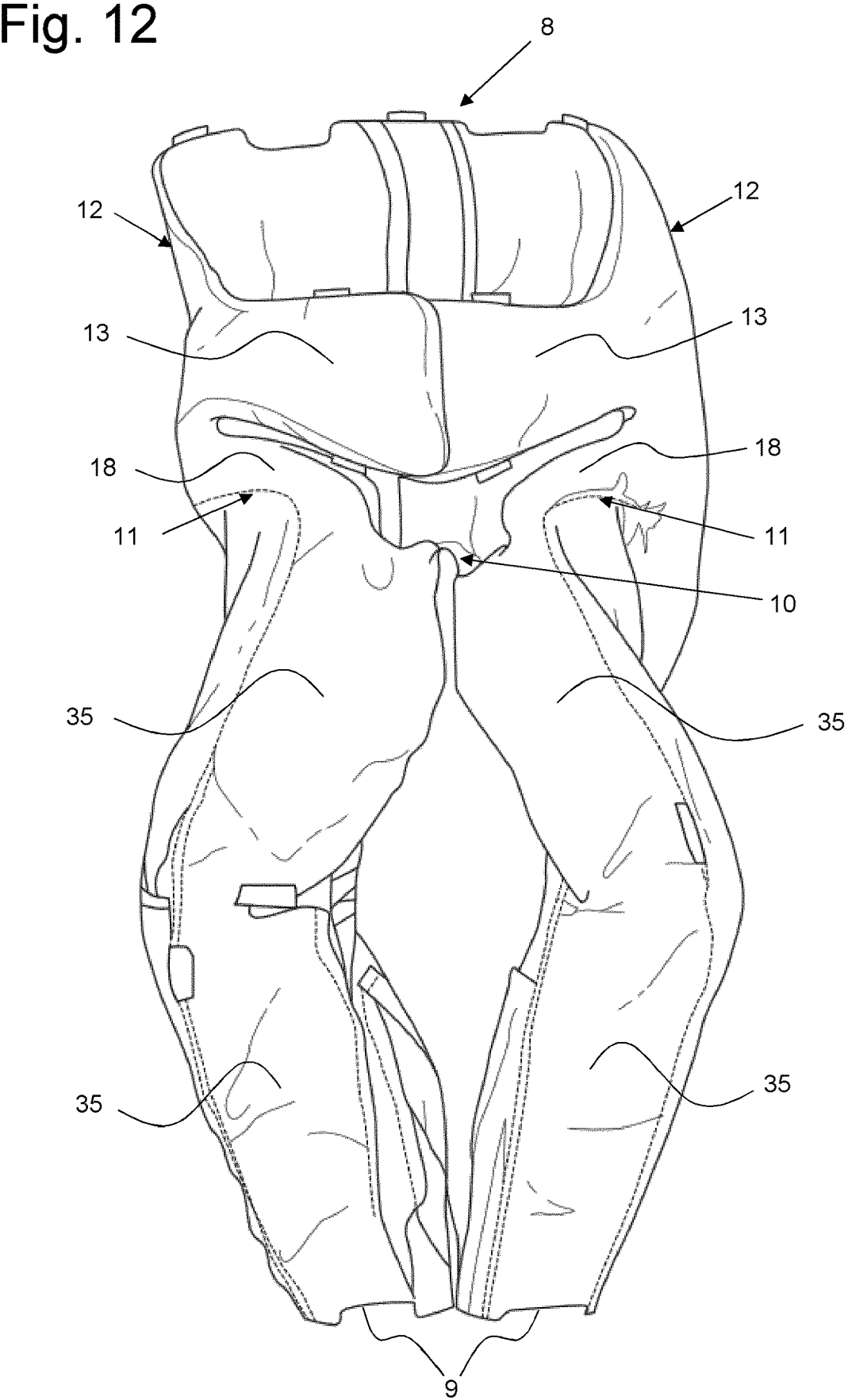
Figure 13:
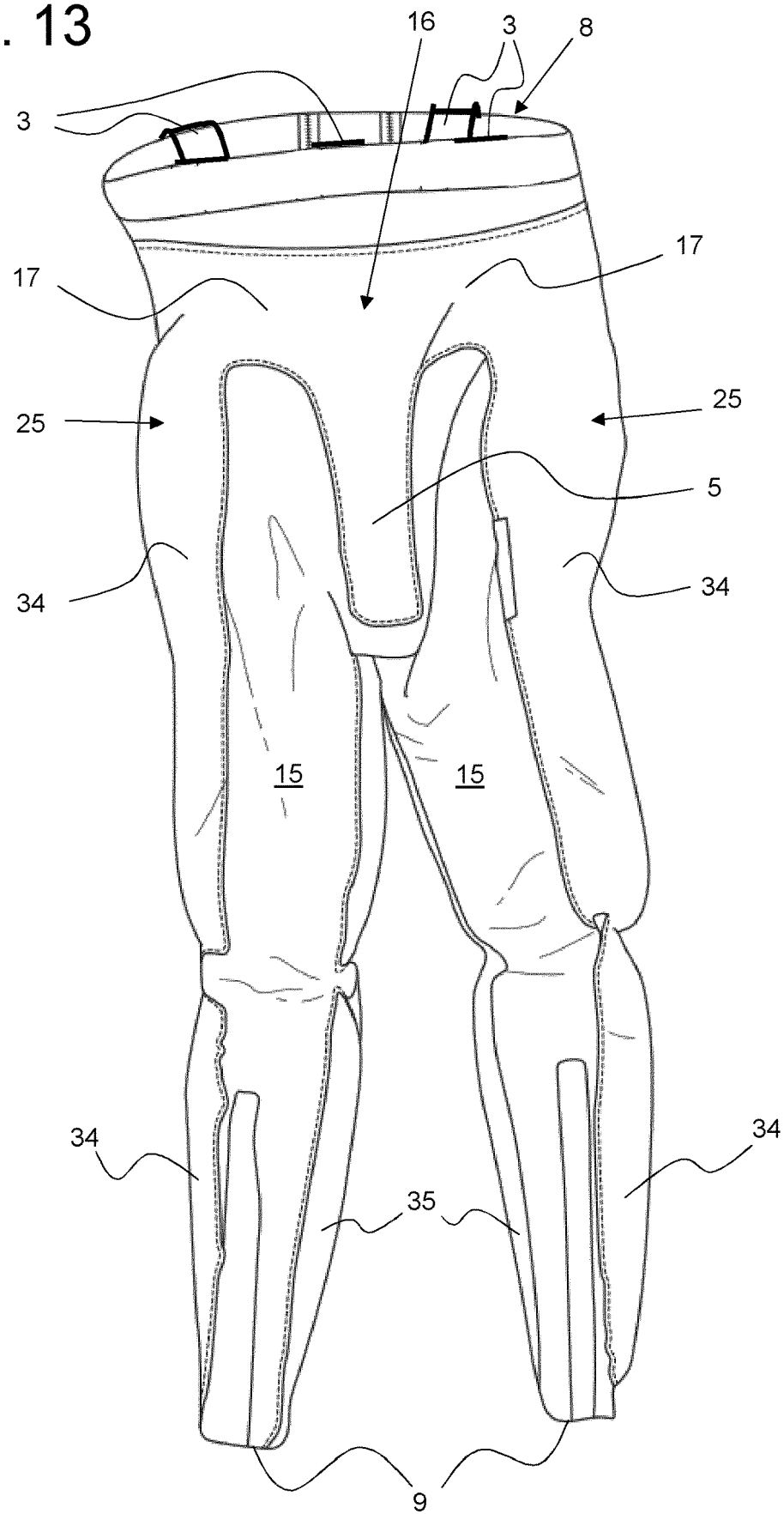
Figure 14:
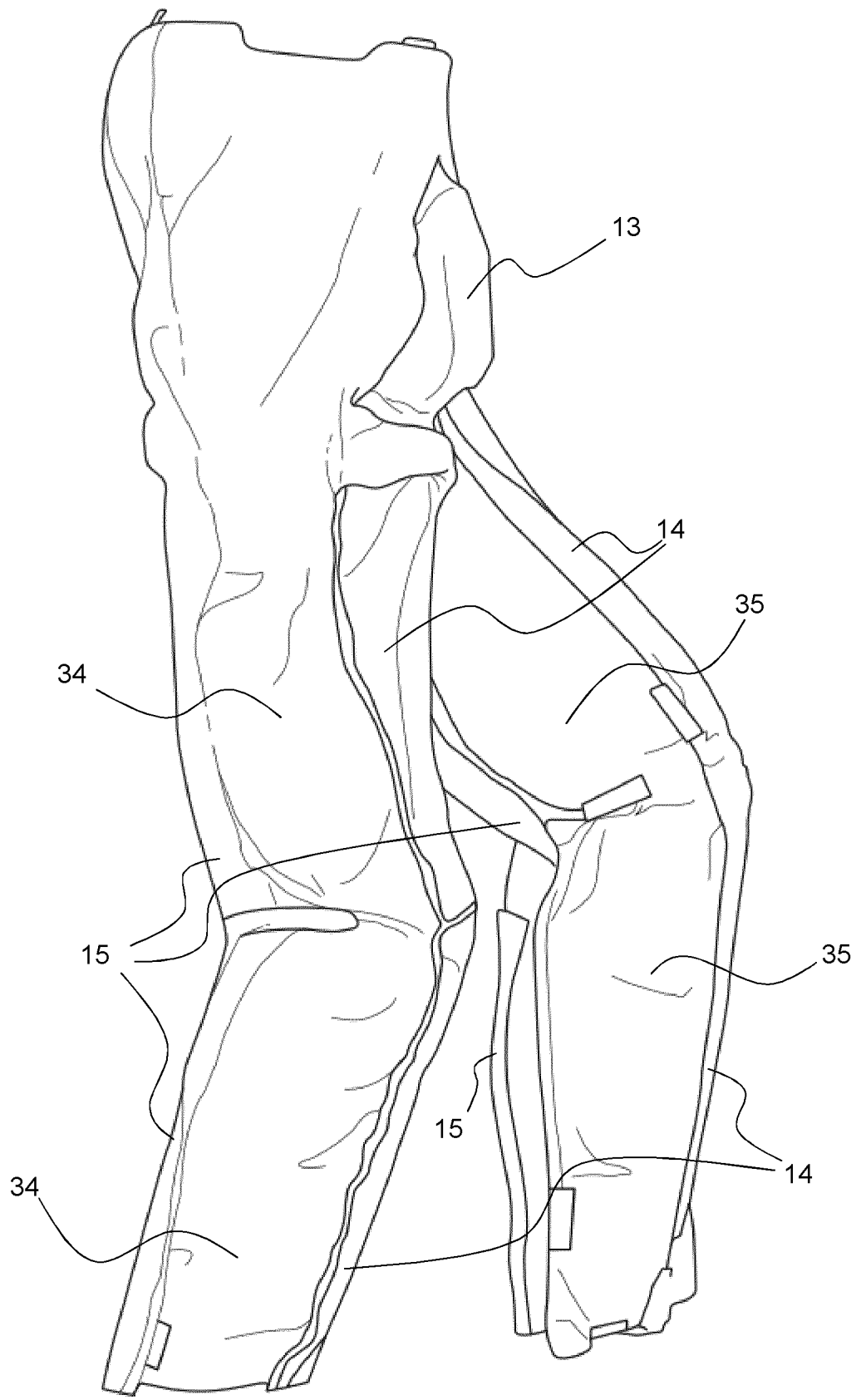
Figure 15:
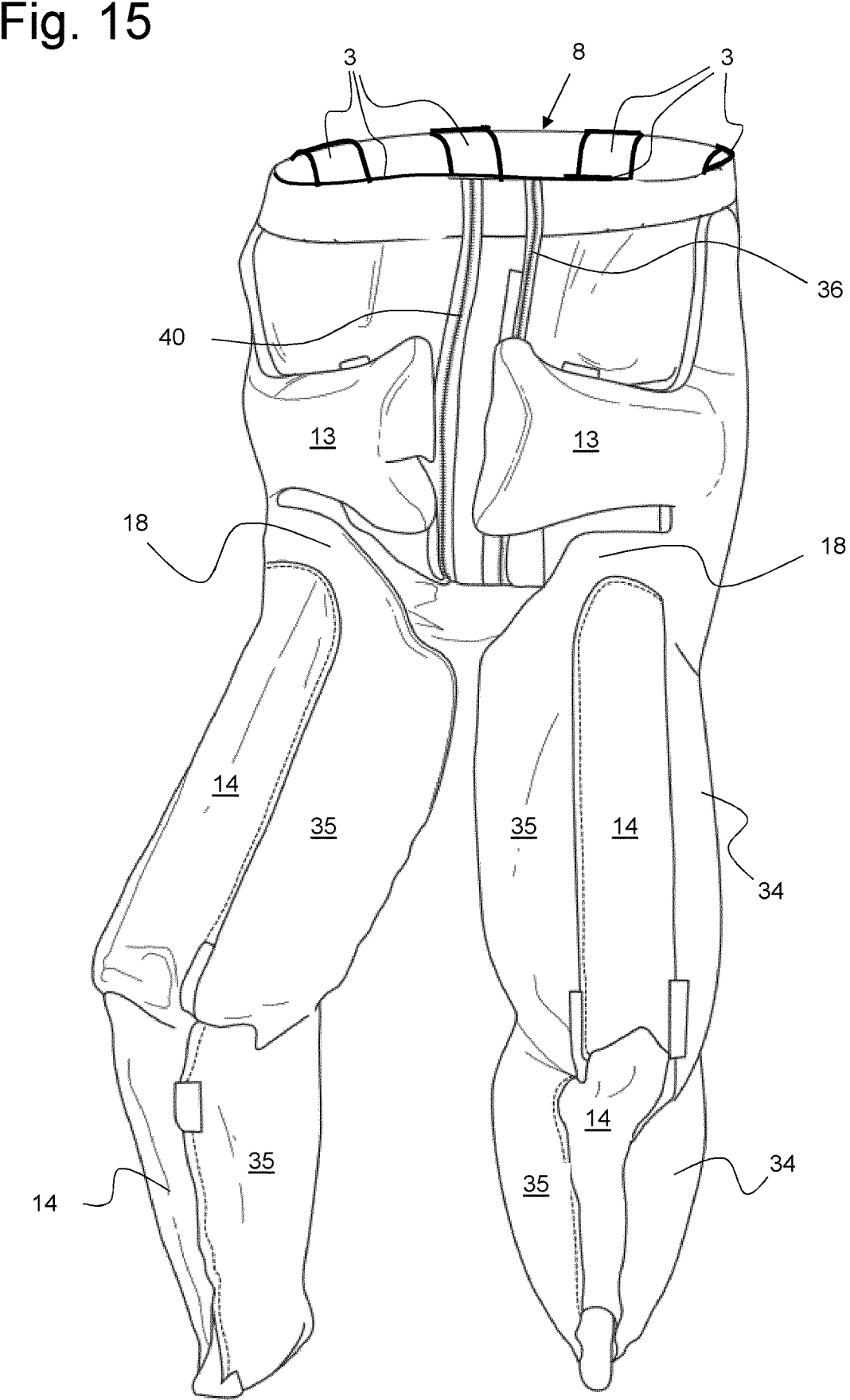
Figure 16:
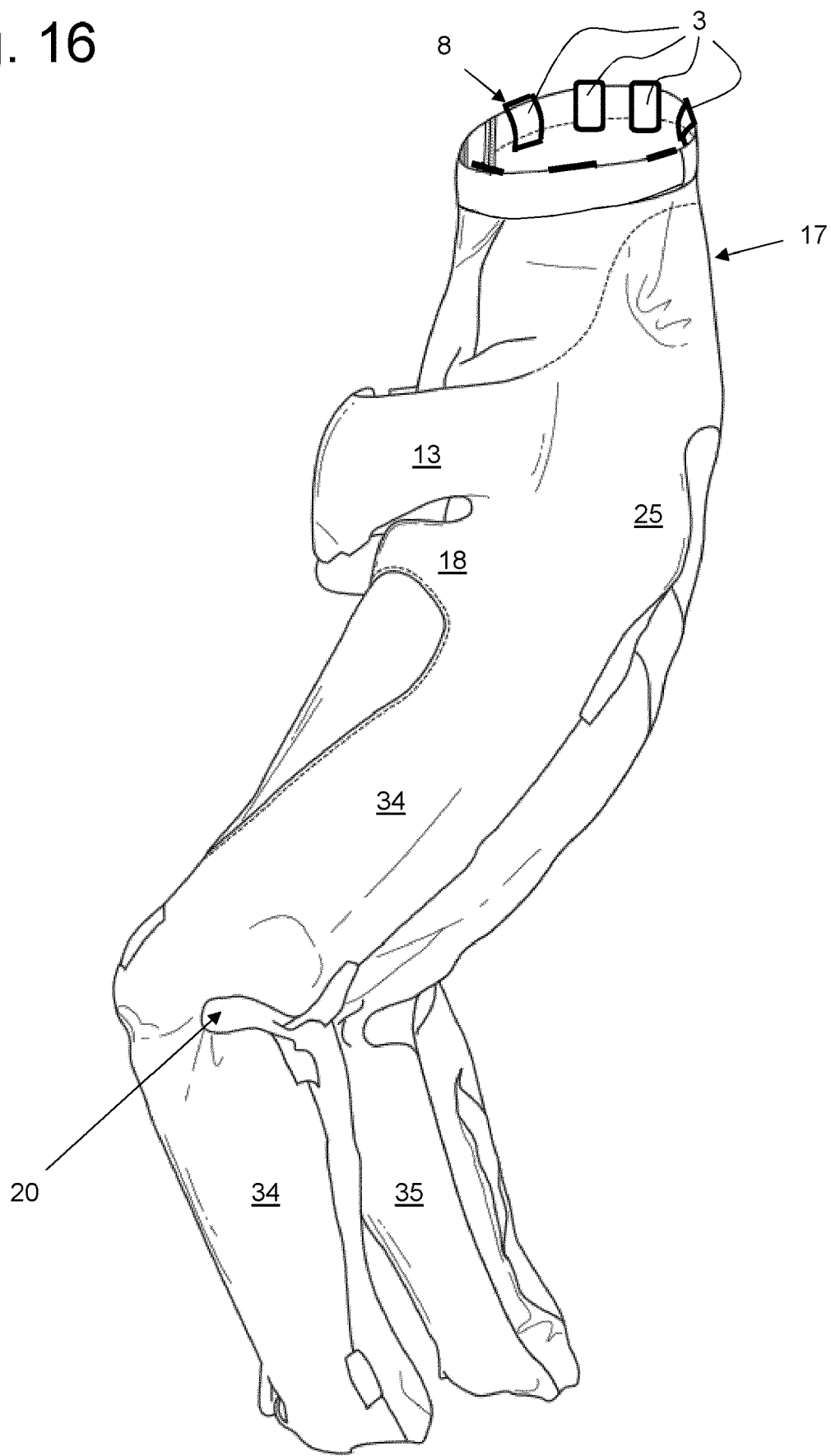
Figure 17:
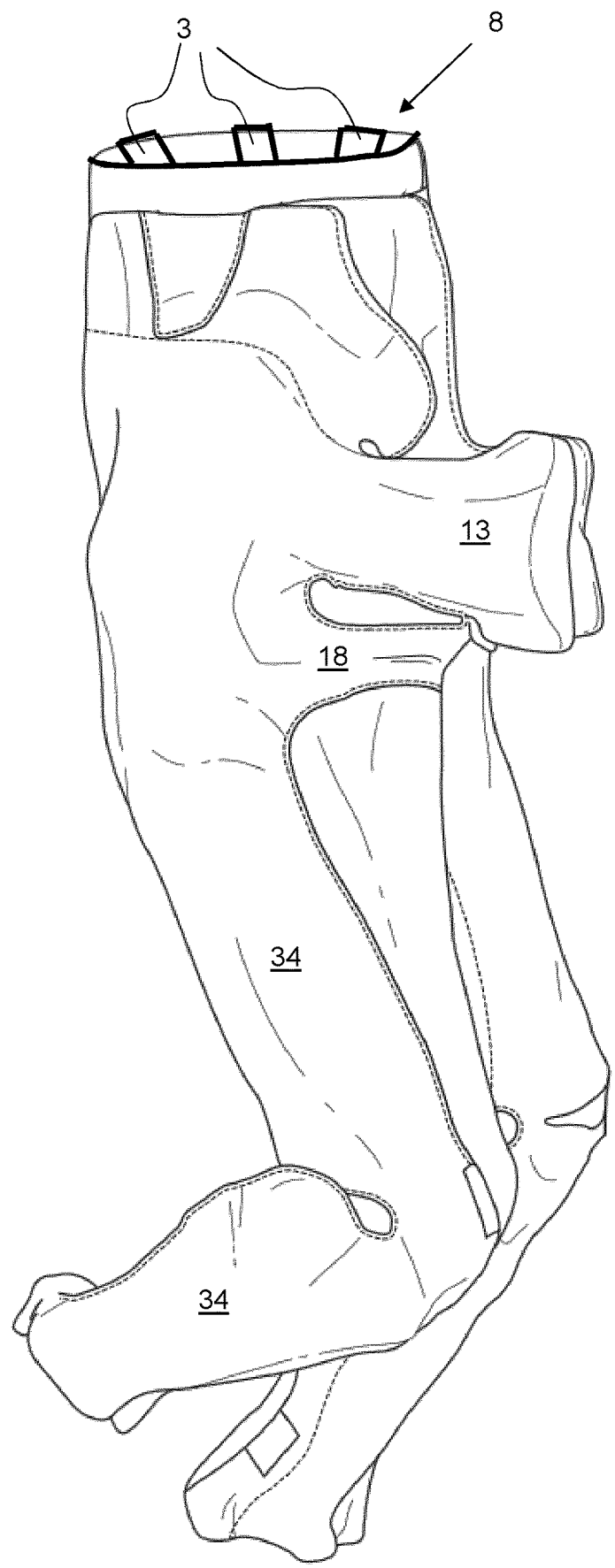
Figure 18:
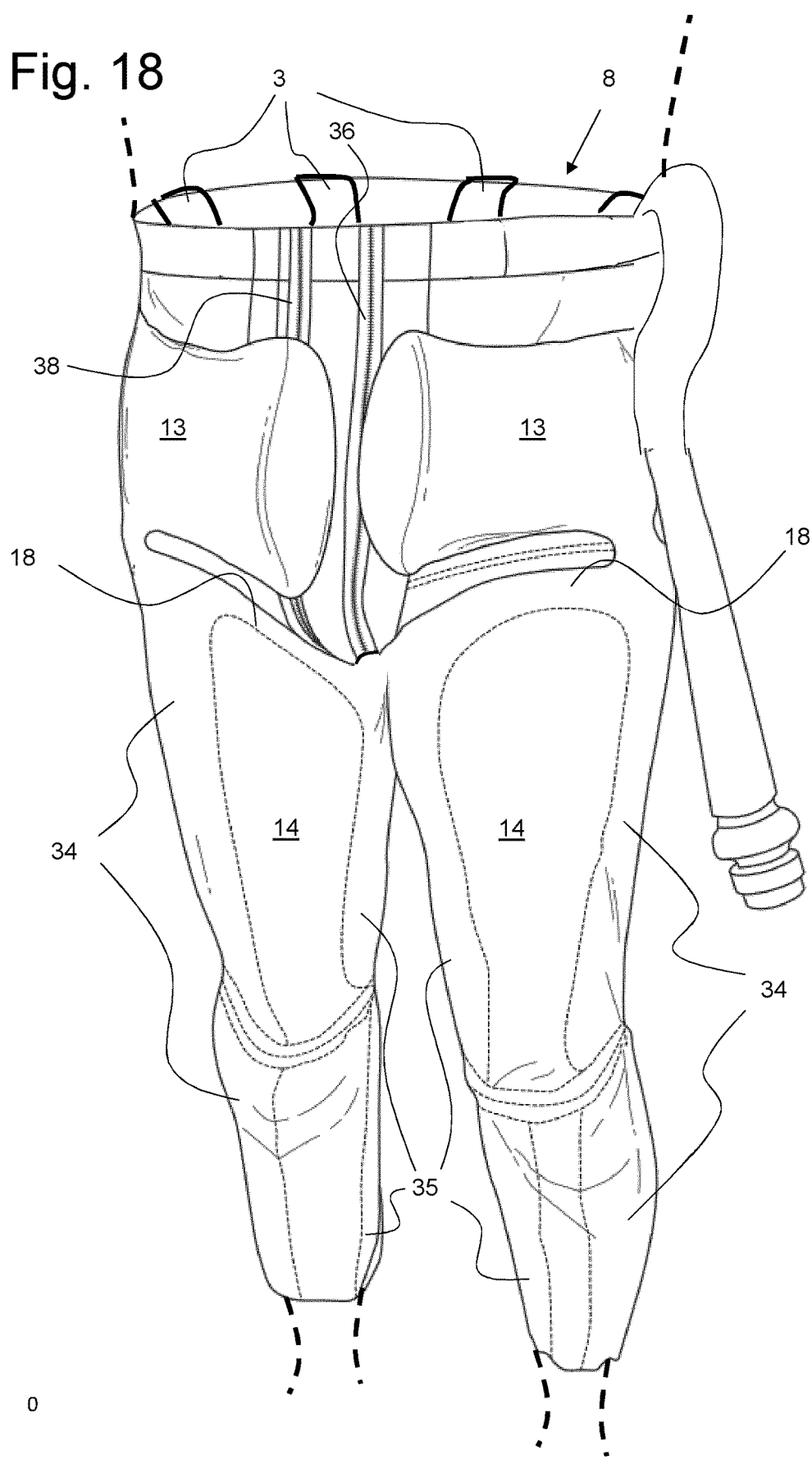
Figure 19:
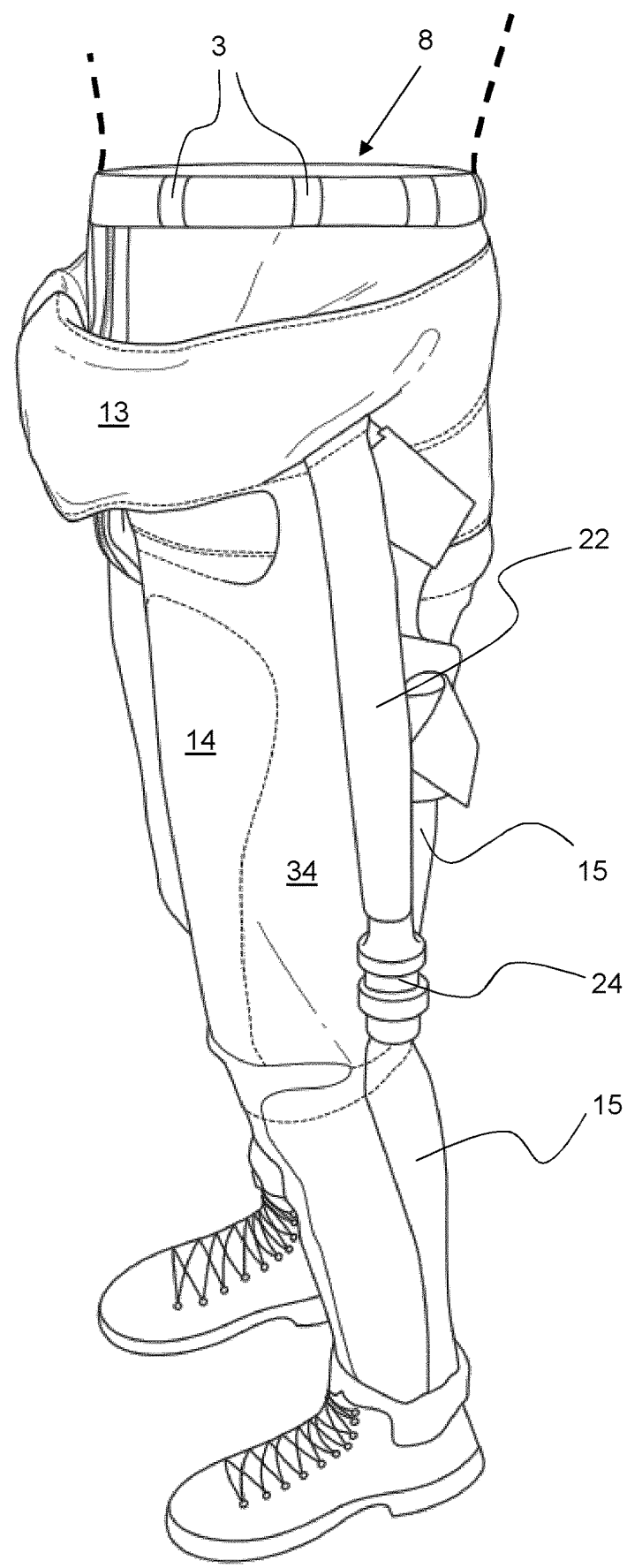
Figure 20:
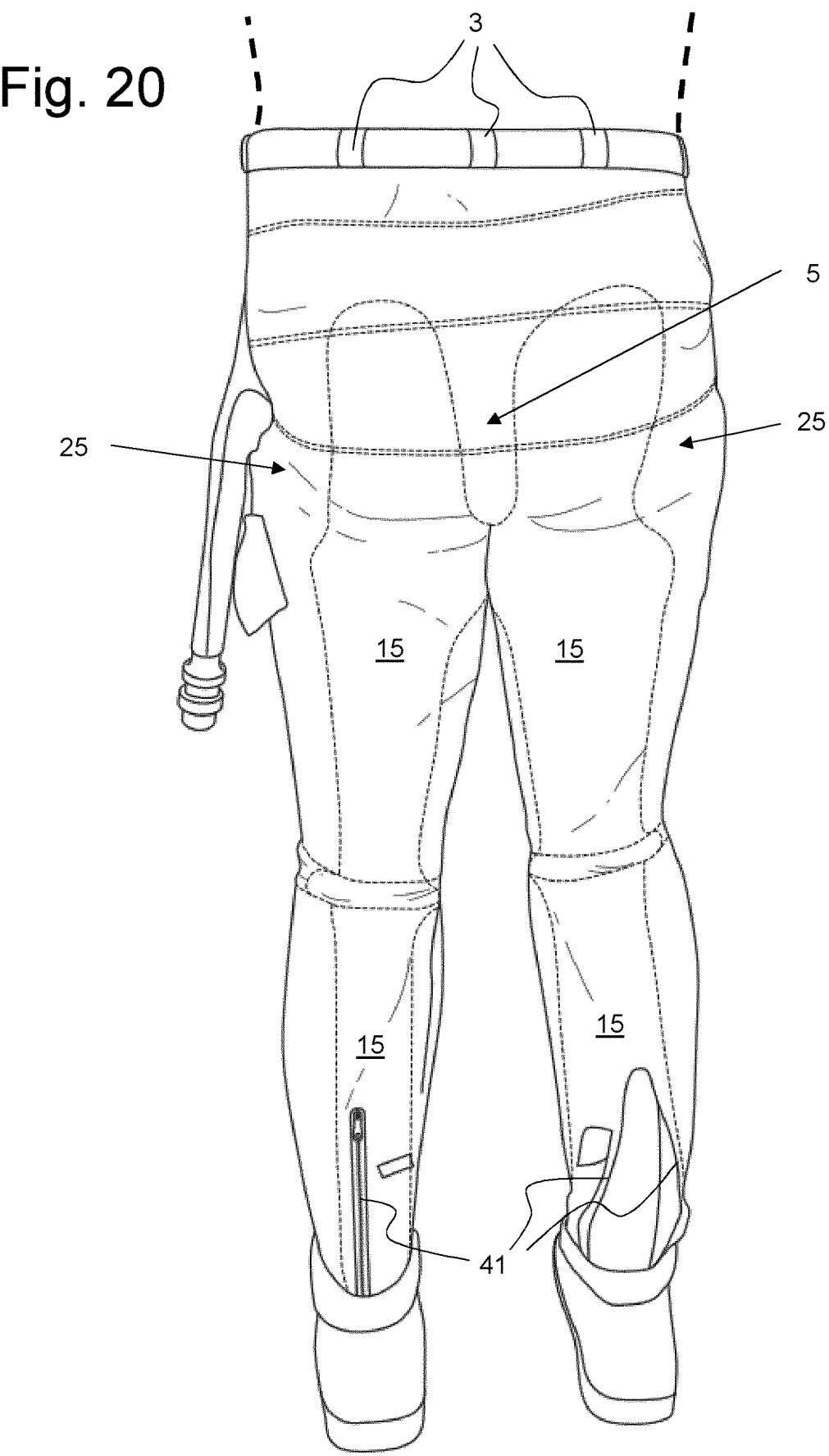
Figure 21:
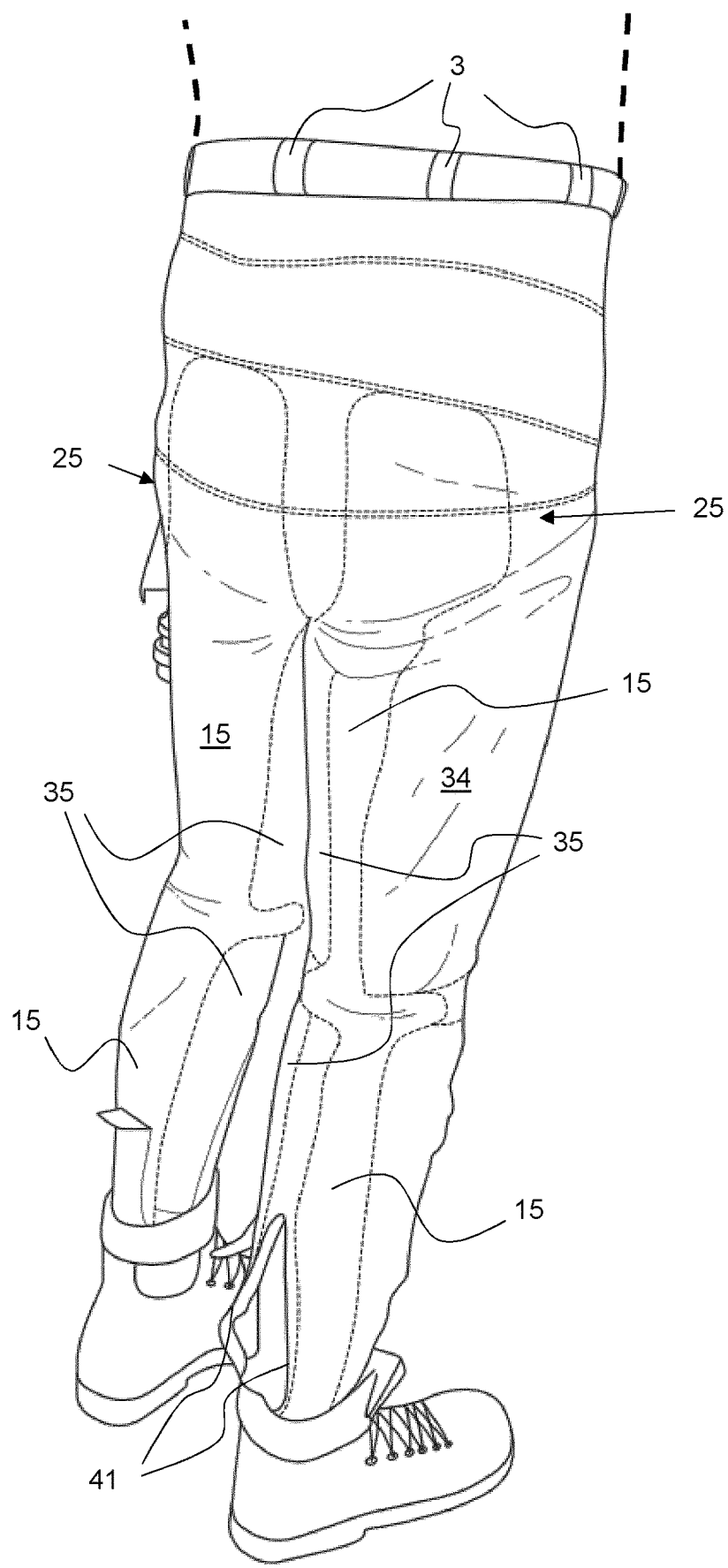
Figure 22:
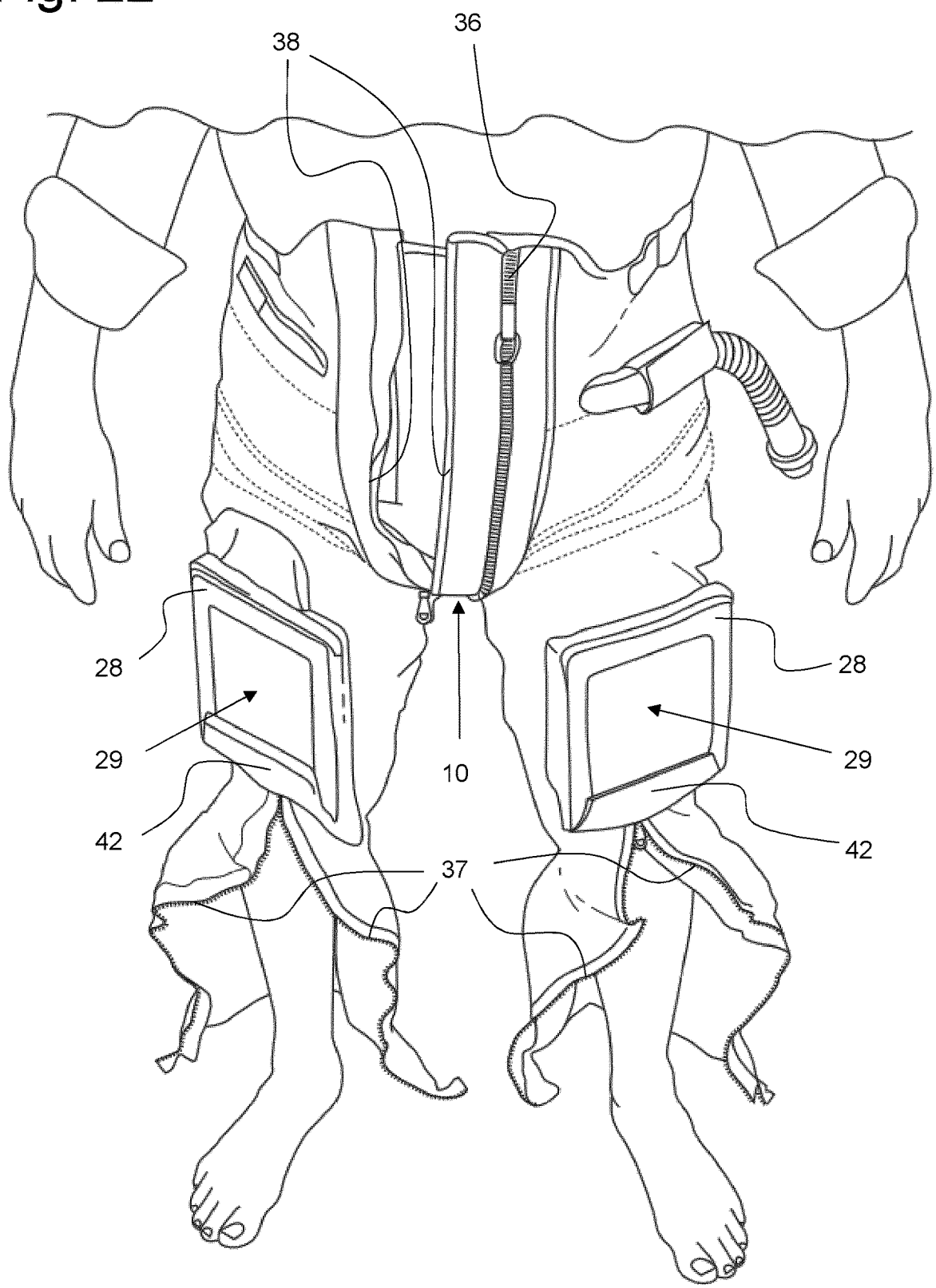
Figure 23:
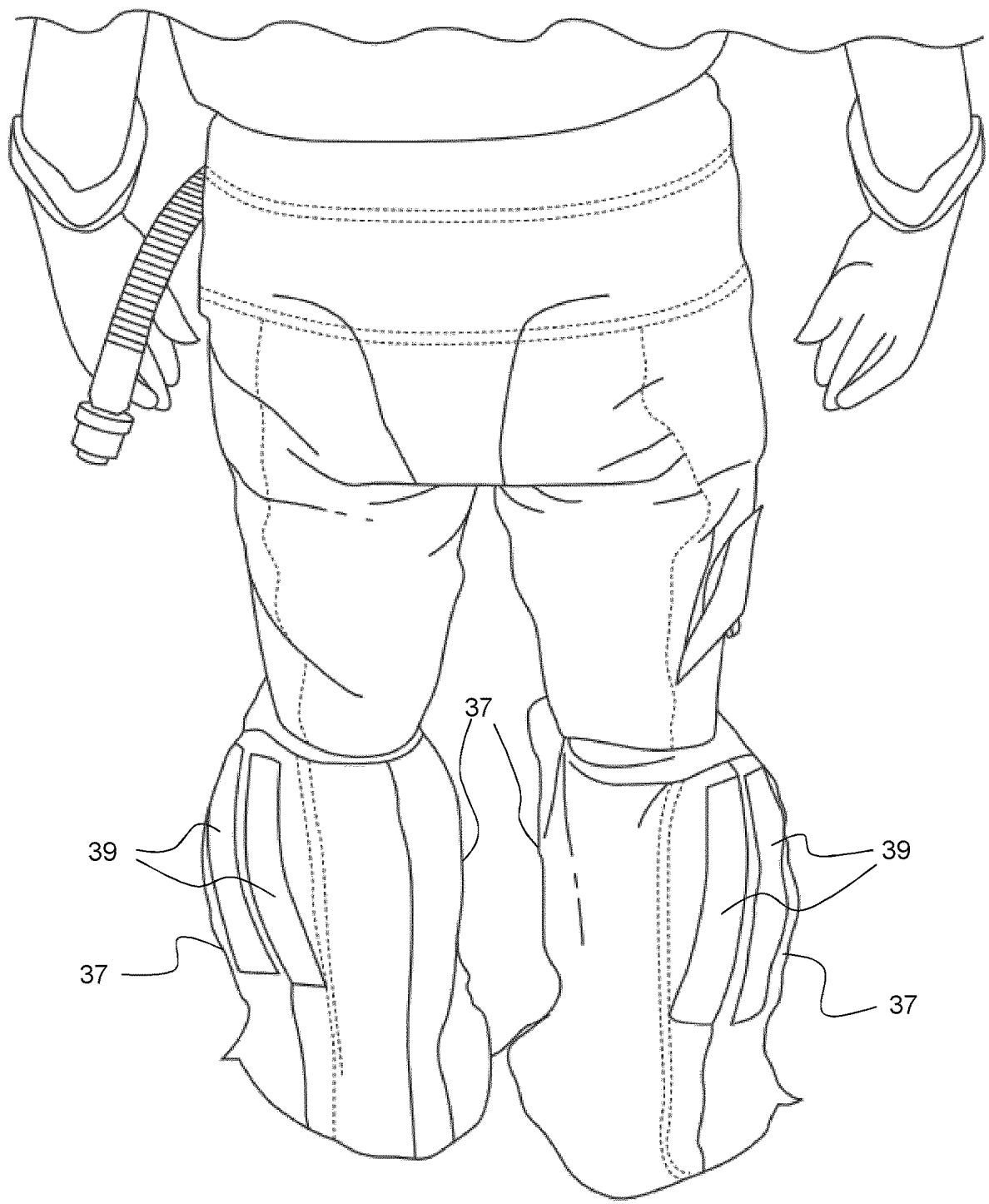
Figure 24:
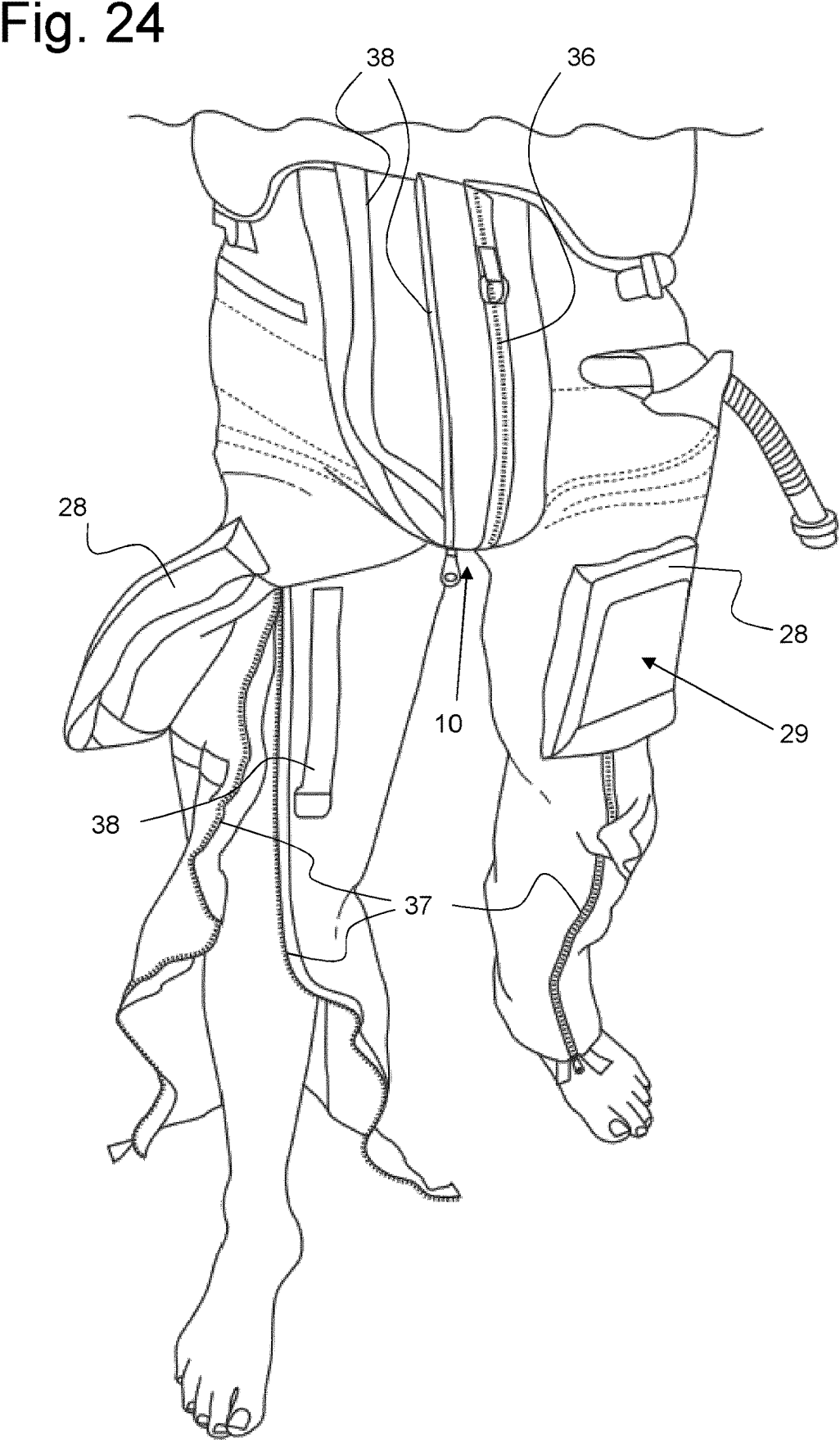
Figure 25:
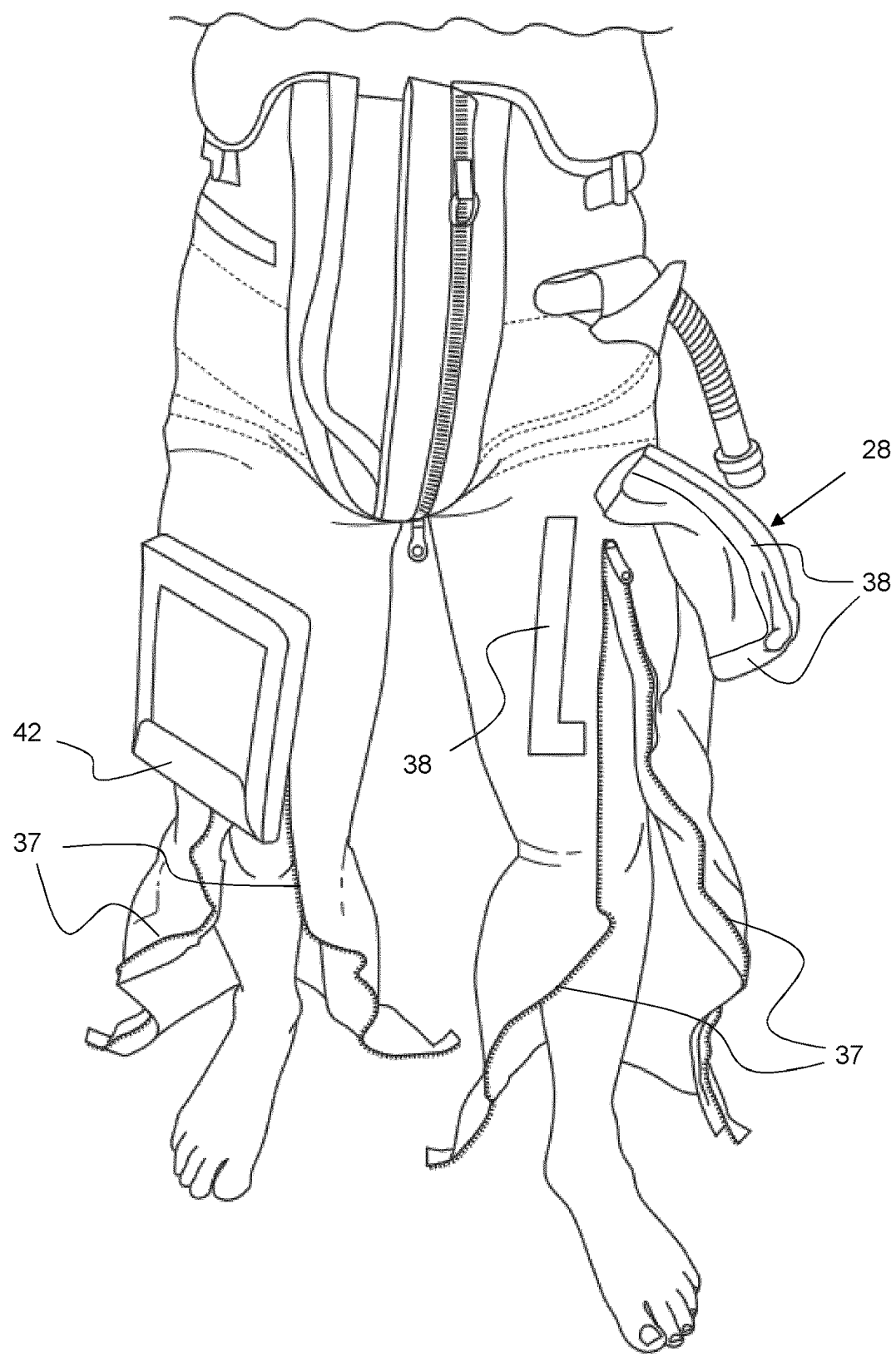
Figure 26:
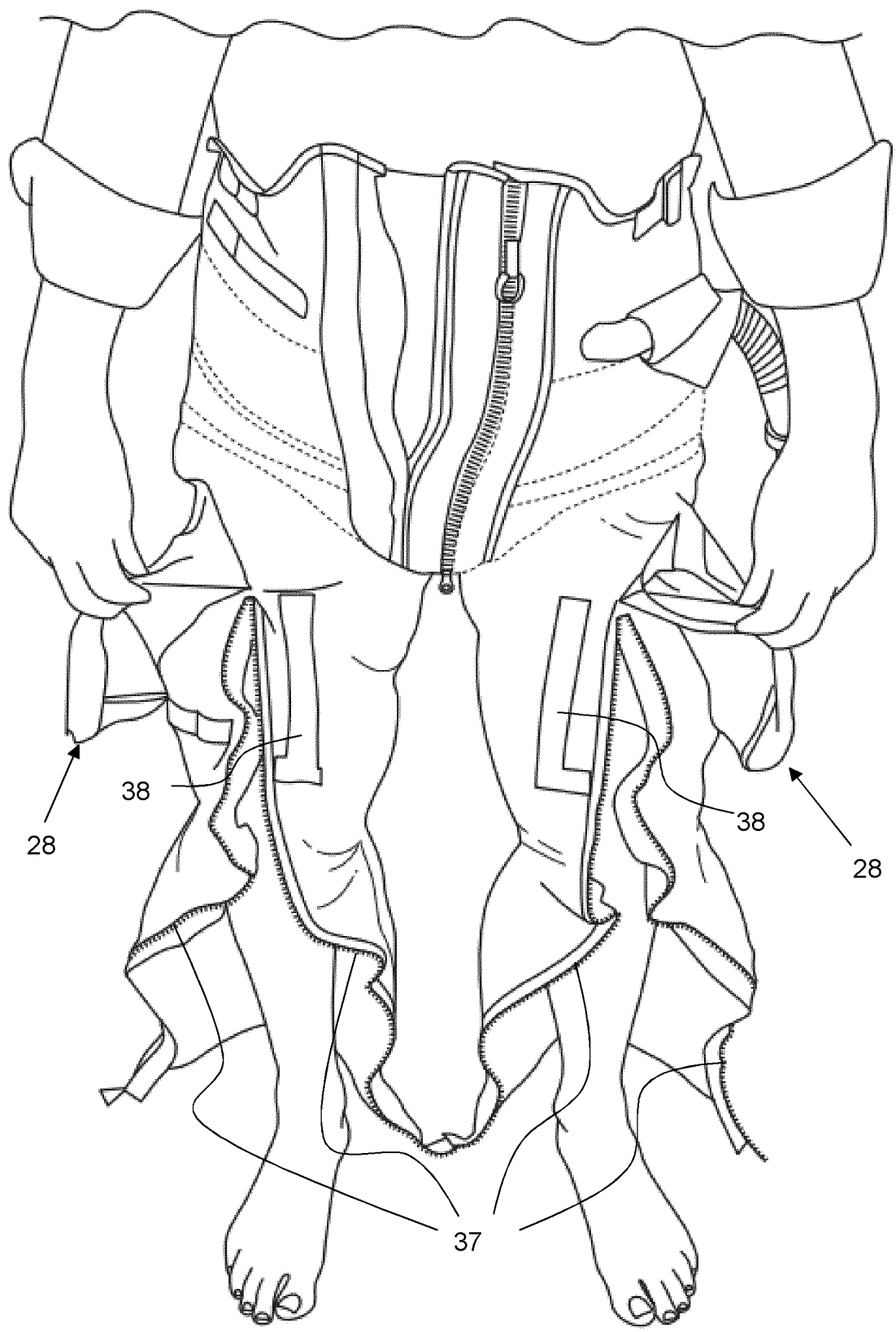
Figure 27:
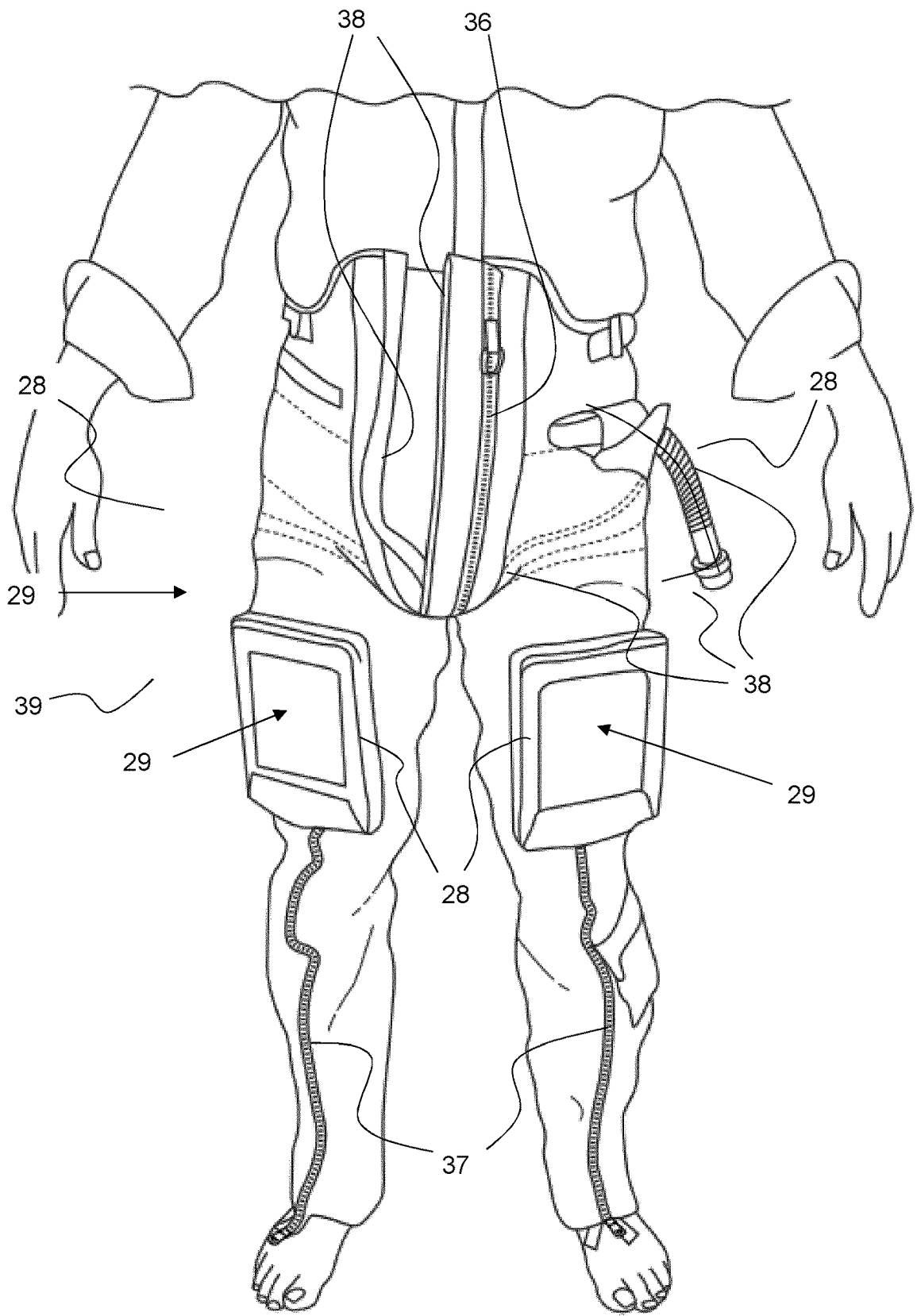
Figure 28:
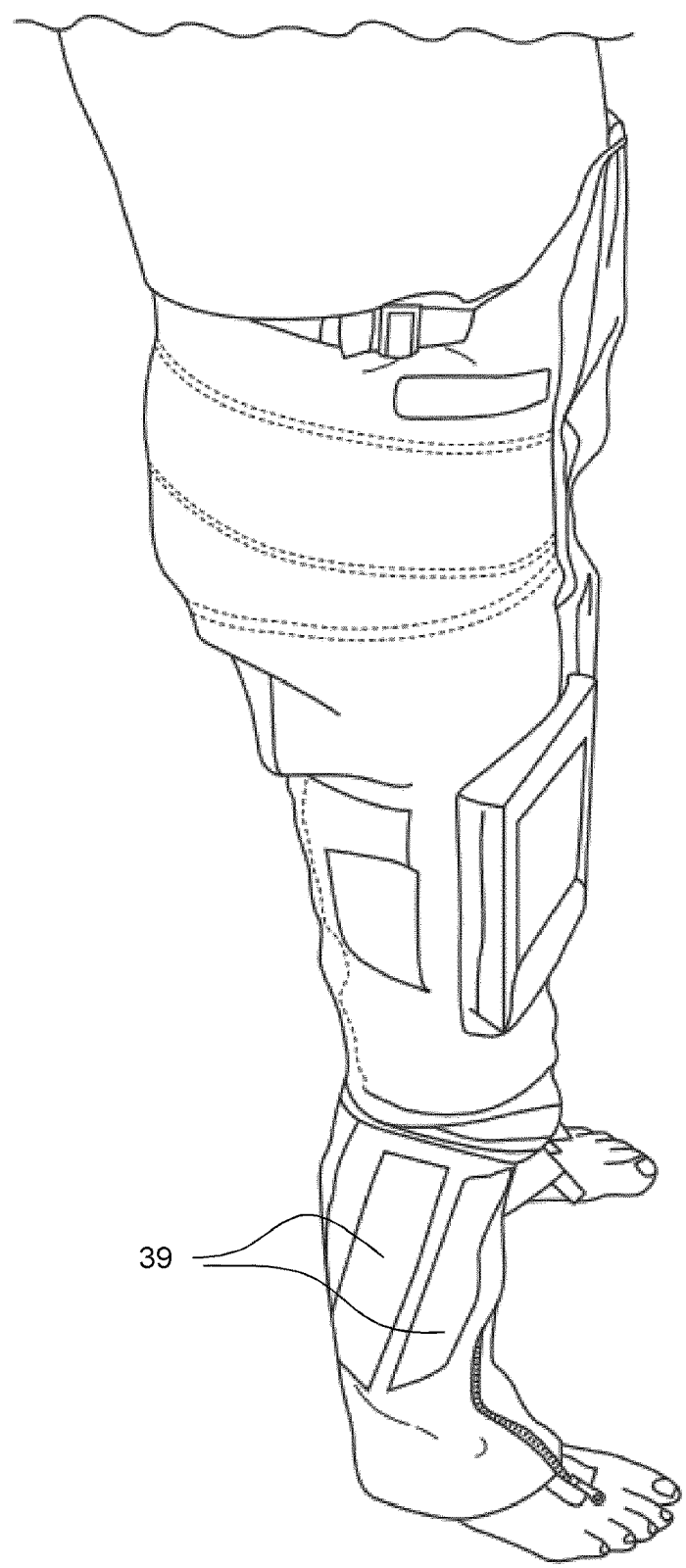
Figure 29:
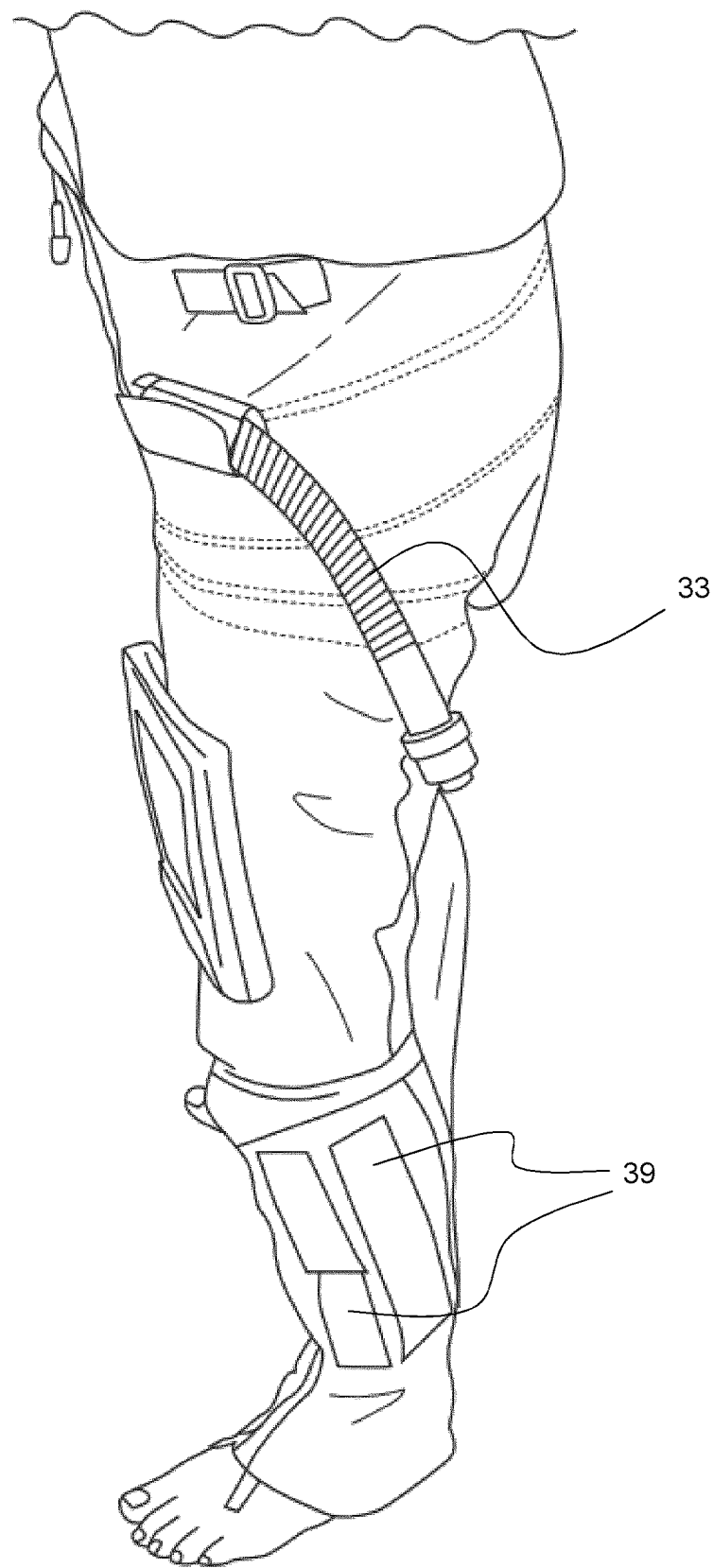
Figure 30:
Figure 31:
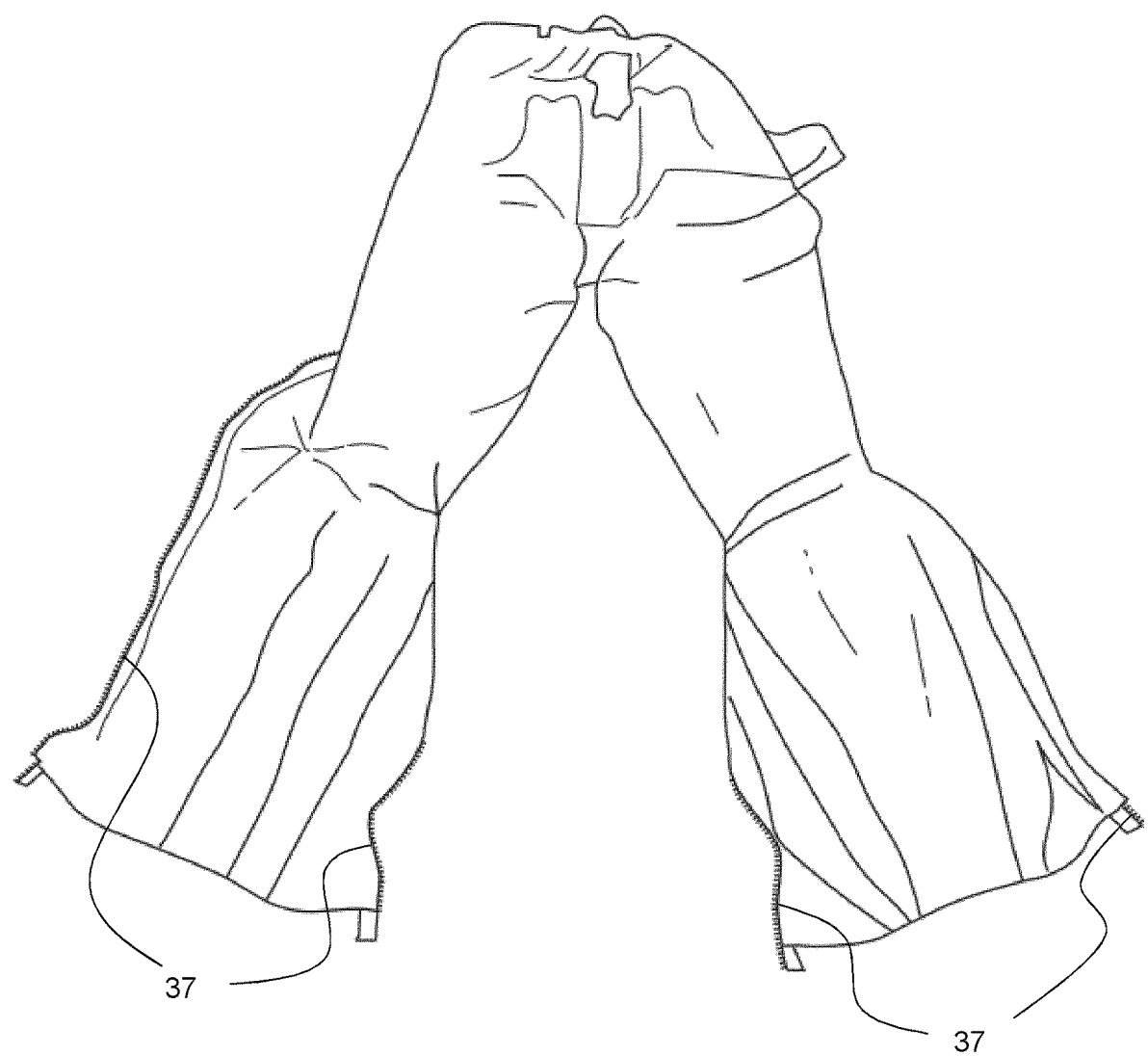
Figure 32:
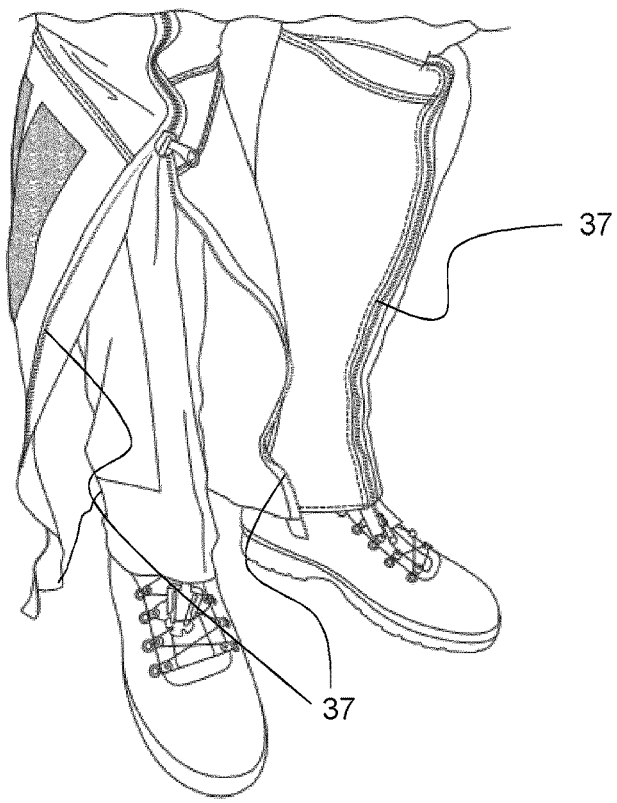
Figure 33:
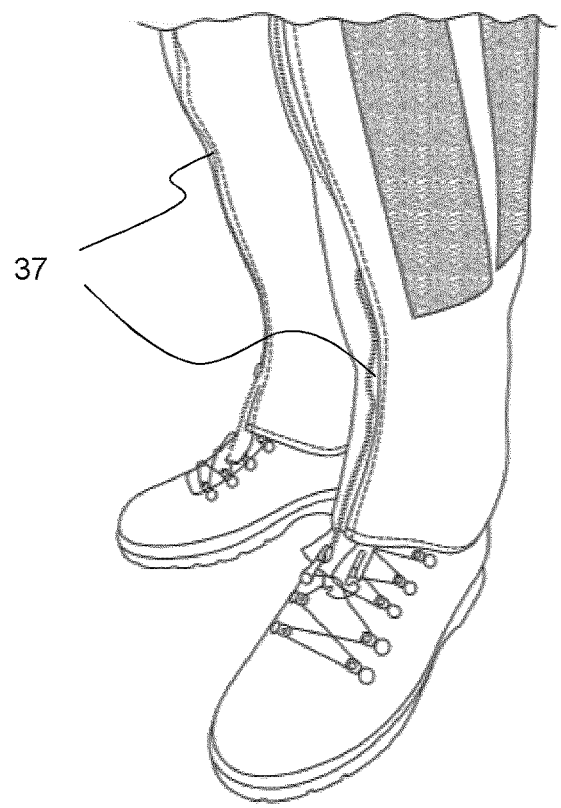
Figure 34:
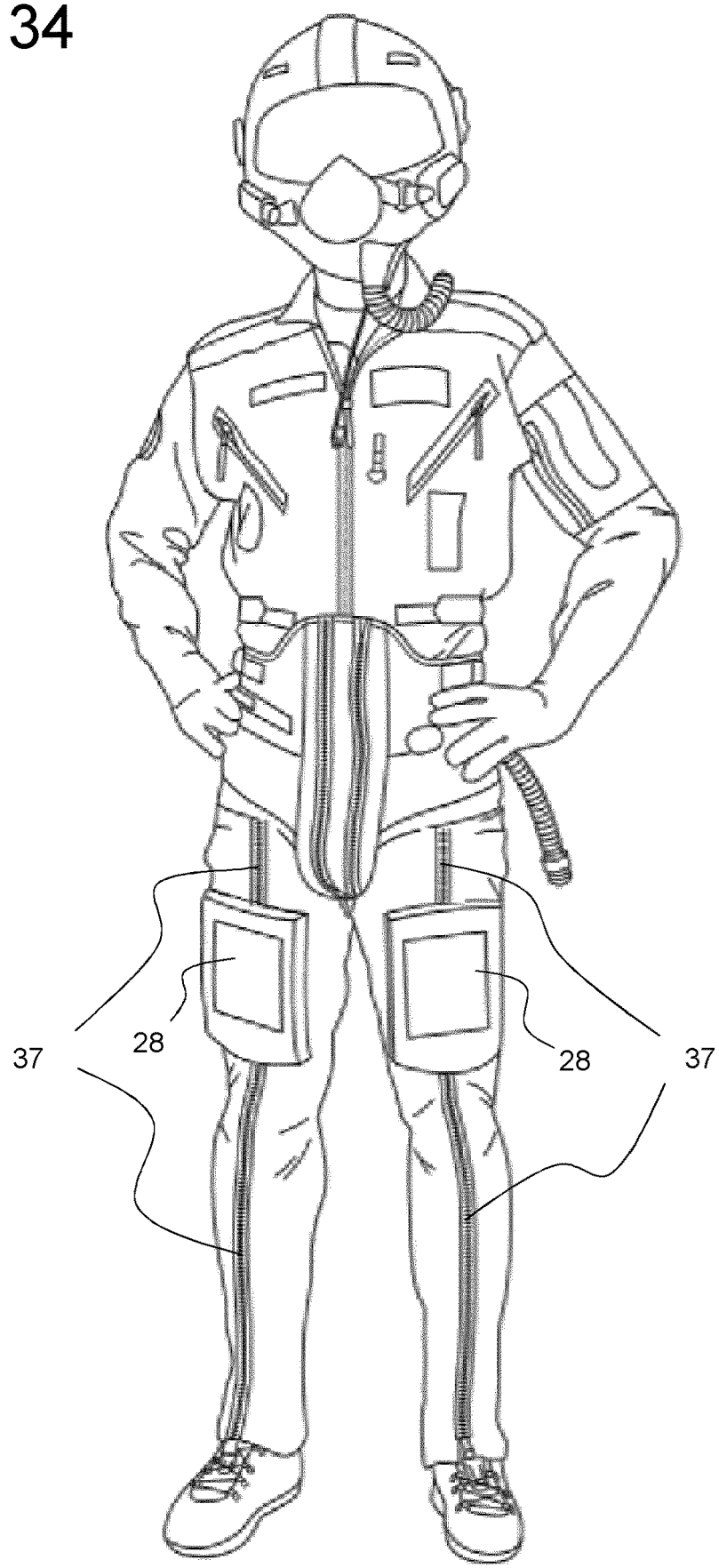

It shows:

FIG. 1: A 5-bladder protective G-trousers according to the prior art;

FIG. 2: The 5-bladder geometry of the protective G trousers according to FIG. 1;

FIG. 3: G-protective trousers with full coverage by blowing according to the state of the technology;

FIG. 4: The geometry of the fully covered bladder of the protective G trousers according to FIG. 3;

FIG. 5: The G protective trousers according to the invention, turned inside out, worn by a virtual body, with pneumatic muscles along the inside and outside of the trouser legs, as well as split belly bladder;

FIG. 6: The geometry of the compartments or the pneumatic muscles of the G-protective trousers according to FIG. 5, which can be inflated with compressed air and are integrated into the G protective trousers, in the state when they are spread out separately on a plane;

FIG. 7: The same as shown in FIG. 6, but with arrows to indicate how the outer compartments here and in FIG. 6 are turned inwards to form the then inner compartments along the insides of the trouser legs;

FIG. 8: The geometry and position of the compartments or the pneumatic muscles of the G-protective trousers according to FIG. 5, in the spatial position within the G protective trousers after turning over according to FIG. 7 for wearing the G protective trousers, but the G protective trousers as shown here with the inside turned outwards;

FIG. 9: A compartment acting as a pneumatic muscle, lined on the inside with a rubber-elastic, air-impermeable and stretchable layer, shown in the flat state in cross-section;

FIG. 10: A compartment acting as a pneumatic muscle, lined on the inside with a rubber-elastic, air-impermeable and stretchable layer, shown in cross section in the partially inflated and contracting state;

FIG. 11: A compartment acting as a pneumatic muscle, lined on the inside with a rubber-elastic, air-impermeable and stretchable layer, shown in the fully inflated and fully contracted state in an approximately circular cross section;

FIG. 12: The G-protective trousers with the inside turned outwards in the slack condition seen from the front, with the two trouser legs slightly bent in the knee area, spread outwards;

FIG. 13: The G protective trousers with the inside turned outwards, seen from the rear, in the state with the compartments partially inflated;

FIG. 14: The G-protective trousers with the inside turned outwards in the relaxed as seen from the right side, lying on the floor, with the knee areas of the two trouser legs angled differently;

FIG. 15: The G protective trousers with the inside turned outwards in the stretched position condition with inflated compartments seen from the front;

FIG. 16: The G protective trousers with the inside turned outwards in the stretched position condition with inflated compartments seen from the left side;

FIG. 17: The G protective trousers with the inside turned outwards in the stretched position condition with inflated compartments seen from the right side;

FIG. 18: Another embodiment of these protective G-trousers with the inside turned outwards in the flaccid state, carried by a virtual body, to show the position of its inner components, seen from a slightly oblique front;

FIG. 19: This embodiment of the G protective trousers with the inside turned outwards in the flaccid state, carried by a virtual body to show the position of its inner components, seen from the left;

FIG. 20: This version of the G protective trousers in the slack state, now with the outside turned outwards, carried by a virtual body, seen from behind;

FIG. 21: This embodiment of the G protective trousers according to FIG. 20 in the slack state, worn by a virtual body, seen from the right and at an angle from the rear;

FIG. 22: Another version of the G-trousers after tightening, with open zippers in the front of the floss legs, seen from the front;

FIG. 23: The G-trousers according to FIG. 22 with the open zippers on the fronts of the flounder legs, seen from behind;

FIG. 24: The G-trousers according to FIGS. 22 and 23 with a closed zipper on the left floss leg and a fully opened zipper on the right floss leg, seen from the front;

FIG. 25: The G-trousers according to FIGS. 22 and 23 with the partially open zipper on the right floss leg and fully opened zipper on the left floss leg, seen from the front;

FIG. 26: The G-trousers according to FIGS. 22 and 23 after being put on, with completely opened zippers on the front sides of the two flounder legs, seen from the front;

FIG. 27: The G-trousers according to FIGS. 22 and 23 in the worn state, with closed zippers on the front sides of the floss legs, seen from the front;

FIG. 28 The G-trousers according to FIGS. 22 to 27 pulled on, viewed on its right side;

FIG. 29: The G-trousers according to FIGS. 22 to 28 put on, viewed on their left side;

FIG. 30: The G-trousers according to FIGS. 22 to 29 lying on the ground, with the open zippers on the front of the flounder legs, seen from the front;

FIG. 31: The G-trousers according to FIGS. 22 to 30 lying on the floor, with the open zippers on the front of the flounder legs, seen from behind;

FIG. 32: The G protective trousers according to FIGS. 22 to 31, worn over an aviator suit and especially over the aviator boots, with an open zipper on the right floss leg;

FIG. 33: The G protective trousers according to FIGS. 22 to 32, worn over an Aviator suit and especially over the aviator boots, with closed zippers on the legs;

FIG. 34: A pilot with these protective G-trousers, dressed over his aviator suit and over his pilot's boots, so that the floppy legs of the G-protective trousers end on the shoes of the boots like those of robbery trousers.

In order to better understand the essence of the invention, the systems of protective G-trousers according to the prior art are first briefly presented and discussed. For this purpose, FIG. 1 shows what are known as 5-bladder protective G trousers in the pulled-on state. It was invented in the late 1940s and is still the most widely produced G-protection system in use. It is known that such G-protection trousers increase the G-protection of a pilot by an average of 1.0 G. They are worn over a pilot's overall 23 and several bladders—five in number—are integrated into their interior. In the area around the crotch and in the front area of the knees there are recesses 40 in order to improve the freedom of movement for sitting. The bladders are all connected to one another and are inflated via a compressed air hose if necessary. The inflated areas then press directly on the body surface of the pilot, and a blood congestion is caused at the edges of the recesses 40, similar to a blood pressure cuff at the doctor, and this blood congestion can lead to circulatory disorders, to increased blood pressure and to an increased blood pressure heart rate.

FIG. 2 shows the bladder system of these protective G-trousers with its five bladders 26 communicating with one another, shown separately. The various bubbles 26 are supplied with compressed air via a hose 27. Within the G protective trousers, a bladder 26 each covers the front of the thigh and the front of the lower leg. In addition, a fifth bladder 26 acts on the lower abdomen. When this bladder system is pressurized, the bladders 26 are inflated according to their geometry and generate pressure on the wearer's body with the aim of counteracting the hemostatic pressure of the pilot. The large volumes of the bubbles 26, which firstly make the system relatively sluggish, with correspondingly long reaction times, have a disadvantageous effect. Second, these airtight bladders 26 cover relatively large parts of the wearer's body and prevent sweat from being carried away there. Therefore, such G-protective trousers turn out to be a real "headlock", that is, they create a build-up of heat in the legs and accordingly the wearing comfort leaves a lot to be desired. In contrast to the new G protective trousers according to this application, this type of G trousers must be worn very tightly in order to provide any anti-G performance, which greatly restricts free movement and comfort.

FIG. 3 shows a further example from the prior art, introduced around 1980, namely full-coverage G protective trousers. In these trousers, which are shown lying loosely on the floor in a view from the front, the bladders extend over much larger parts of the wearer's body, as will be shown below. These conventional G-protective trousers are made of a relatively heavy and non-breathable textile material according to ISO 9237 20 to 90 $I/m^2 xs$, preferably of a fire-resistant Nomex aramid fabric as the outer shell, in which the bladder is located. The bladder system is made of reinforced and non-stretchable polyurethane-coated nylon. The outer shell is equipped with zippers for the waist and lower legs, with, for example, six adjustable lacing areas with laces and two easily removable leg pockets 28 with zippers for opening and closing. These pockets 28 with viewing windows 29 are incorporated on the front of the thighs for receiving and viewing documents. Again: In contrast to the new G protective trousers according to this application, this type of G trousers shown in FIG. 3 must be worn very tightly in order to provide effective anti-G performance, which greatly restricts the free movement and comfort of the pilot, and the donning time is much longer. It also does not pressure the buttocks and its large belly bladder pushes/pressures violently and very uncomfortably into the stomach area under pressure. Such trousers increase the G-protection of a pilot by an average of 1.5 G.

FIG. 4 shows the bladder system of these full-coverage protective G-trousers according to FIG. 3, shown separately. The bladder 30 extends practically around the entire surface of the legs by fully wrapping the two legs each from the outside except for a gap 31 along the inside of the trouser legs—hence the term full-coverage G-protective trousers. At the top, the bladder 30 is continued over the lumbar and lower abdominal area 32 and covers this up to the lateral hips. This bladder 30 is supplied with compressed air from a hose 33 which opens at the side. Here, too, the covering of large parts of the legs and the lower abdomen proves to be disadvantageous for the dissipation of heat from the body. Many parts of the body are covered by these trousers with airtight material and they therefore act as real "sweat trousers", because when one is flying one does sit on the buttocks and thus no heat can be dissipated from the one's body. Such full-coverage G-protective trousers have proven to be correspondingly uncomfortable to wear. The large volume of the one-piece bladder 30 leads to a system-related inertia, that is to say the reaction times for pressure build-up and pressure reduction again are relatively long.

The G protective trousers according to the invention are shown in FIG. 5 with the inside turned outwards and, in contrast to the previously known G protective trousers, these protective trousers are basically and consistently made of a unique material, specially developed for these G-protective trousers, which offers high air permeability according to DIN EN ISO 9237 up to 500 $I/m^2 xs$ min. This material is also characterized by an extremely high tear strength according to ISO 13934-1 of up to 2000 N/5 cm. This ISO 13934-1 standard specifies a method for determining the maximum force and elongation of textile fabrics using a strip method. The method is mainly applicable to textile fabrics, including fabrics which have elongation properties, which are obtained firstly by the presence of elastomeric fibers in the fabric, and secondly also by a mechanical or chemical treatment of the fabric. However, it can also be applied to fabrics made with other techniques, but not to geotextiles, nonwovens, coated fabrics, glass fabrics, and fabrics made from carbon fibers or polyolefin tape yarns. The procedure specifies the determination of the maximum force and elongation at maximum force of test specimens in equilibrium with the standard atmosphere for the test, and of test specimens in the wet state. The procedure is limited to the use of CRE testing machines (Constant Rate of Extension).

These protective G-trousers as shown in FIG. 5 offer extremely high load-bearing capacity with very little stretch and their weight per unit area is only a very low 121+/−5 grams/square meter. The material of these G-protective trousers can be worn directly on the skin, which also eliminates the compressibility of the otherwise necessary classic underwear. For hygienic reasons, however, the G-protective trousers can optionally be worn with specially adapted, fireproof, wafer-thin and breathable textile underwear. These G protective trousers are exceptionally comfortable to wear, and feel like a very fine natural cotton, similar to pajamas. The fabric of these G-trousers consists of fire-resistant, fully synthetic, antistatic, very hard-wearing and low-stretch yarn mixtures, including aramid fibers, which are processed into a breathable fabric. The front and rear sides of the trouser legs are designed solely as textile strips 14. They are breathable and allow body heat to be dissipated.

As a special feature, these G-protective trousers are not built on the basis of a conventional bladder system, but rather contain a pneumatic muscle system made up of compartments with a small and divided abdominal bladder 13. Outer such compartments 34 extend along the outer sides of the two flounder legs from the waistband to the lower hem 9 of the trousers. Inner compartments 35 of this type extend along the inner sides of the trouser legs from the crotch down to the lower hem 9 of the trousers. These outer 34 and inner 35 compartments are connected to one another along the lower strip edge 11 via a respective strip channel 18. At the front and back between the outer 34 and inner compartments 35, i.e. in the area of the front and back of the trouser legs, air-permeable textile strips 14, 15 (also shown in FIG. 14) are installed, which are then placed directly on the front and back of the legs of the wearer. The outer compartments 34 extend above the legs over the lower abdominal area and each form a sack-like pocket for the formation of a bubble 13 each, so that the two bubbles 13 thus formed cover the entire lower abdominal area. On the back, the two outer compartments 34 are connected via a channel, as will become clear from further drawings. These compartments, which act as pneumatically contracting muscles, are pressurized over the entire lower body including the legs if necessary, whereby these compartments 34, 35, 18, 13 have a relatively small area coverage, but can still apply pressure to the entire lower body. The aim of these pneumatically contracting muscles is not to act directly as inflated areas with pressure on the adjacent body, but rather indirectly, by stretching the adjacent air-permeable fabric parts around the body. They pull the bubble-free fabric strips 14, 15 together immediately if necessary and span the body parts or limbs covered with them, whereby the pressure is applied to the body there. After extensive centrifuge tests, it turned out that these protective G-trousers offer pilots an average of 3.5 to 3.8 G more G-protection, i.e. 2 to 3 times more G-protection than all other G-protective trousers available on the market. These G-protective trousers have an extremely light overall weight, which corresponds to about a third less weight than those of conventional G-protective trousers. It allows easy donning like jeans, in contrast to the usual G protective trousers that are complicated to put on.

The built-in compartments 34, 35, 18, 13 accordingly act as pneumatically functioning muscles for contracting, not as mere bubbles that are intended to press directly on the body surface. These compartments are integrated into the textile material, for example by sewing or gluing or welding, by doubling up by applying a strip of textile material inside or outside of the textile material of the protective G-trousers, so that the strip is only connected to the textile material at its edge. These compartments are made of the same low-stretch material as the rest of the textile material. In a first variant, flexible, stretchable hoses made of an elastomer are inserted into these compartments and expand when pressure is applied. These inflated tubes then lay against the inside of the compartments and inflate them into a circular cross-section. As a result, the two lateral edges of the initially flat compartments move towards each other, that is, they contract, and they thus tension the textile pieces adjoining the compartments on the outside. In another embodiment, the compartments are lined on the inside with a rubber-elastic, air-impermeable material to form a seal. When air is pumped into the interior of the compartments, the compartments are instantly deformed into a circular cross-section and contractingly pull the textile pieces lying on the outside together, which then encircle the covered body parts and thus exert pressure on the body surface.

FIG. 6 shows the geometry of the compartments or these pneumatically contracting muscles of the protective G trousers according to FIG. 5, which can be inflated with compressed air and are integrated into the protective G trousers, in the state when spread out on a plane. The compartments 34 are intended for the outside of the two trouser legs. The compartments 35 drawn on the outside in the picture, on the other hand, are intended for the two inner sides of the trouser legs and they are turned over for installation as indicated in FIG. 7 with the curved arrows. At the top, the compartments 35 for the inside of the trouser legs are connected to the compartments 34 for the outside of the trouser legs via a respective last channel 18. The compartments 34 for the outside of the trouser legs extend from the hips even further upwards to the waistband. They each run into a sack-like pocket as a bladder 13 on the front of the trousers, which two bladders 13 then jointly cover the entire lower abdominal area. The outer compartments 34 are connected to one another via a further channel 17 with the area coming to the rear, in the small of the back area 16 of the carrier. A coccyx channel 5 branches off from this channel 17 in the downward direction, which then extends downward between the buttocks of the wearer when the G-protective trousers are worn. This coccyx canal 5 measures 2 cm to 6 cm in width and extends downwards to apply pressure to the buttocks, but without the dangerous "air cushion effect" in the event of an ejection seat actuation.

In FIG. 8, this fan geometry is shown in a spatial representation, on G-protective trousers, with the compartments 35 for the inner sides of the trouser legs, based on the situation as shown in FIG. 6 and FIG. 7, but these compartments 35 now inward turned over. The compartments 34 for the outer sides of the trouser legs thus run on the outside along the outer sides of the trouser legs and the compartments 35 which extend along the inside of the trouser legs are connected to the outer compartments 34 via the welt channels 18 in a communicating manner. All areas between the outer 34 and inner compartments 35 remain expressly free of airtight covering or are bridged by a well airpermeable textile material. In the lower abdomen area, starting from the position in FIG. 6 and FIG. 7, the sack-like pockets folded inwards can be seen as bubbles 13. The connecting channel 17 and the coccyx channel 5 branching off from it downward can be seen in the small of the back area.

All such pneumatic muscles for the trouser legs are only incorporated on the outside and inside of the two trouser legs, so that the front and rear sides of the trouser legs remain free of compartments and the textile materials there lie directly on the legs as textile strips 14, 15 and in these areas a high level of air permeability is offered in order to allow sweat to diffuse to the outside. Inflation on the upper side of the thighs when sitting is thus effectively avoided. The pilot can rest his forearm on his thigh regardless of the G load and the pressure applied to the G protective trousers and the arm remains calm when the load changes. In particular, this facilitates continuous turning.

FIG. 9 shows a cross section through such a textile compartment as a pneumatically acting, contracting muscle. On one side, which can be arranged on the outside as well as on the inside of the basic trouser material 4, a textile strip 7 is applied. On the inside of the compartment formed in this way, in the example shown in FIG. 9, this is completely lined with a rubber-elastic, airtight layer 2. In the two corners 6 of the compartment 1, the airtight coatings 2 are brought together in a sealing manner. If air is pumped into the interior of this compartment 1, it puffs up because the air cannot escape and the compartment finally has a circular cross-section. The edges are contracted towards each other. It is clear that the textile strips 14, 15 adjoining the two sides of the compartment—here on the left and right of the compartment—are thereby drawn together towards one another, as indicated in FIG. 10 with the arrows on the outside left and right. In FIG. 10, the compartment 1 shown is namely partially inflated. This inflation can be continued until the cross section of the compartment 1 becomes approximately circular, as shown in FIG. 11. There is also a Dry Air Cooling System as a design option: In this case, compressed air, which is supplied separately through laminated ventilation arteries 21, is relaxed through the lip-shaped openings 19 onto the wearer's body surface, where it causes a cooling effect for him.

The airtight inner fan coatings or the air hoses inserted in them are made of an elastomer and are therefore flexible and stretchable. As shown in FIGS. 9 to 11, they are encased on both sides by less stretchable textile coverings and form the compartments 1 of the G protective trousers. If the air hoses or the interior of the fan coatings 2 in the compartments 1 are pressurized with compressed air, they stretch adjacent pieces of textile and thus build up a circumferential tension o, which builds up a pressure p inside the body tissue via the relationship $$\sigma = p * r$$

Therefore, $$p = \frac{\sigma[N/m]}{r[m]} [N/m^2]$$

is inversely proportional to the local curvature r of the body part.

Instead of equipping the compartments 1 with an airtight rubber-elastic coating 2 on the inside, an expandable rubber-elastic tube can also be guided loosely through the interior of a compartment 1 as an alternative. When air is pumped into the same, it expands and finally fills the interior of the compartment 1 completely, and with sufficient internal pressure this hose can inflate the compartment to an approximately circular cross-section. The two edges of the compartment are contracted accordingly and the subsequent air-permeable textile strips 14, 15 are drawn together.

FIG. 12 shows these G protective trousers with the inside turned outwards, lying on the floor in the flaccid state and viewed from the front, with the two trouser legs slightly bent outwards in the knee area. As on the outside of the trouser legs, compartments 35 also extend on the inside thereof from the crotch 10 along the trouser legs down to the trouser hems 9. From step 10, groin channels 18 extend obliquely outwards and upwards from compartments 35, along the lower edge 11 of the groin to the outer side 12 of the trousers, the hip area. From there, further compartments extend into the front area of the trousers below the waistband 8, each in the form of a sack-like pocket as a bubble 13 horizontally along the waistband 8 to the middle of the waist of the wearer.

FIG. 13 shows the protective G-trousers with the inside turned outwards in the state with slightly inflated compartments 34, 35 and seen from the rear. As this FIG. 13 shows, the waistband 8 can be equipped with belt loops 3. These are here on the inside because in this illustration the inside of the trousers is turned outwards. The compartments 34 for tensioning the trousers in these protective G-trousers presented here run from the vicinity of the waistband 8 of the trousers down on the two outer sides of the trousers, along the outside of the trouser legs down to the trouser hems 9. From the area of the waistband 8, on both sides of the trousers, the compartments 34 extend horizontally on the rear side of the trousers visible here to the small of the back area 16 and in particular cover the outer halves 25 of the buttocks. From the middle of the back of the waistband, a compartment in the form of a coccyx channel 5 extends downwards from 2 cm to 6 cm in width to the height of the crotch of the wearer of the trousers. If air pressure is applied to the pneumatically interconnected compartments 5, 17, 34, 35, they all bulge out and they all contract in their width. They therefore shorten the distances between the two fan edges and thus tension the adjoining air-permeable textile parts 15 and thus enclose the covered body parts with more or less tensile stress. Because the textile for these trousers is an extremely low-stretch textile material, both in terms of fiber stretch and binding stretch, this tensile stress and tight enclosure of the body parts, especially the thighs and lower legs, but also the entire pelvic area and especially the buttocks, is very effective and Immediately implemented. At the same time, this single-layer textile material lying on the body is particularly breathable and therefore air-permeable. It is precisely this property that ensures that the wearer can transpire and that his sweat can escape through the flat textile strips 14, 15 resting on the body. The textile sections 15 between the outer 34 and inner compartments 35 on the back of the trouser legs are made with the same thin and air-permeable fabric and are used for comfortable sitting. Due to their single layer, they ensure the most direct and therefore natural contact possible with the seat surface of the cockpit seat. The wearing comfort is therefore very significantly and incomparably improved compared to conventional air-impermeable or almost air-impermeable fabrics. When empty or flat, the compartments have a maximum width of a few centimeters.

FIG. 14 shows these G protective trousers with the inside turned outwards in the slack state with a view of the right side, the trousers lying on the floor, with the left trouser leg being shown slightly pushed forward. The inner compartment 35 can be seen here on the left trouser leg and the outer compartment 34 on the right trouser leg. The textile pieces 14, 15 lying between the compartments 34, 35 of a trouser leg are made of thin and air-permeable material. Those on the front of the legs are designated here by 14, those on the back of the legs by 15. There, these areas 14, 15 above all ensure that, firstly, the tension built up by the compartments 34, 35 is, thanks to the good Air permeability and thus breathability of this textile maintained because the textile material is elastic, and secondly—very importantly—that the sweat when the wearer perspires material can diffuse to the outside. Because these G-protective trousers are also made of particularly light textile, they offer a level of comfort previously unknown for G-suits. On the front of the G protective trousers, the right of the two bag-like bladders 13 can be seen, which extend in front of the wearer's stomach area.

In FIG. 15, these G protective trousers are shown with the inside turned outwards in the tensioned state, that is to say with inflated compartments, viewed from the front. That is why the belt loops 3 are on the inside here. The compartments 34 running along the outside of the trouser legs are now inflated, as are the compartments 35 running along the inside of the trouser legs. The inner compartments 35 open at the top into the groin channels 18, which run along the lower edge of the groin, that is to say obliquely outwards and upwards, and which lead into the lateral areas up to close to the waistband 8. From the side areas in the hip area, a sack-like pocket branches off on each side of the G protective trousers to form a bladder 13 towards the middle of the abdomen. In this figure, the textile strips 14 can be seen on the front of the trouser legs, which are made of thin and air-permeable fabric, so that this low-stretch but very breathable fabric lies directly on the wearer's bare leg. The wearer can transpire over these front and rear sides of the trouser legs, which means that his sweat can efficiently diffuse outward through the textile strips 14, 15, which greatly increases the wearing comfort of these protective G-trousers.

FIG. 16 shows the G protective trousers with the inside turned outwards in the slack state with empty compartments 13, 18, 25, 34, 35, viewed on the left side of the trousers. In this representation one looks at the outer compartments 34 on the left outer side of the left trouser leg. In the knee area, the compartment 34 is cut in such a way that an indentation 20 is formed which enables the knee to be angled for the sitting position in the cockpit seat without tension. Otherwise, the compartment 34 is continuous, for the thigh as well as the lower leg of the wearer.

FIG. 17 shows the G protective trousers with the inside turned outwards in the partially stretched state with not fully inflated compartments 13, 18, 34, seen from the right side, with differently developed knee areas of the two flounder legs. Here one can clearly see the clearly visible compartment 34 on the right side of the trousers, that is to say the right trouser leg and the right hip. The sack-like bladder 13 can be seen in front of the lumbar region, which extends below the waistband 8 along the same and which meets in the middle with the bladder 13 arranged symmetrically to the opposite bladder.

In FIG. 18 these G protective trousers are shown with the inside turned outwards in the slack state, put on a virtual body, which is indicated by dashed lines, seen from a slightly oblique front, to show the position of the individual components inside the trousers. One recognizes the outer compartments 34 along the outer sides of the trouser legs and the inner compartments 35 along the inner sides of the trouser legs. In between, thin and air-permeable pieces of textile 14 are arranged to maintain the tensile stress when the compartments 34, 35 are inflated, and to allow perspiration to diffuse out. At the top, the inguinal ducts 18 adjoin the inner compartments 35, and then above the same the two sack-like bladders 13 for pressurizing the groin and lower abdominal area in the inflated state. The G protective trousers come to an end with the waistband 8 at the top. There are two zippers 36, 38 from the crotch to the waistband 8 out. The zip fastener 36 is the primary zip fastener and the second zip fastener 38 is only opened in the event of a great increase in weight of the wearer in order to be able to enlarge or widen the waist of the trousers. These G protective trousers are designed and sewn with a similar fit to the trousers of a leather motorcycle suit, i.e. with trouser legs for bent legs. Ultimately, this results in a much more comfortable sitting position when exposed to high pressure.

FIG. 19 shows this embodiment of the G protective trousers with the inside turned outwards in the flaccid state, drawn on a virtual body, which is indicated by dashed lines, viewed from the left side, to show the position of the inner components. You can see the outer compartment 34 on the outside of the left trouser leg, followed by the thin and air-permeable compartment that adjoins it at the front textile piece 14 as well as the thin and air-permeable textile piece 15 adjoining the compartment 34 at the rear. One can also see the supply hose 22 with the connecting raccord 24 for the compressed air, facing outwards. The compressed air supply is already available in aircraft that are flown with G protective suits. It allows a finely adjustable, automatically controllable compressed air supply and compressed air discharge and it can continue to be used seamlessly with this G protective trousers.

FIG. 20 shows the G protective trousers in the slack state, now with the outside on the outside and pulled on against a pilot, seen from behind, with an indication of the position of the inner components. Here one can see the thin and air-permeable textile inlays 15 on the back of the trouser legs and the two compartment areas 25, which cover the outer halves of the pilot's buttocks. The lower legs of the trouser legs are equipped with zippers 41 here. The same is also shown in FIG. 21 in a view from a slightly oblique rearward view. Underneath the waistband 8, the two buttocks compartments 25 can be seen below, following the outer compartments 34, which buttocks compartments 25 cover approximately the outer halves of the pilot's buttocks. FIGS. 19 to 21 show the G-protective trousers in the version in which they are worn in the boots and under an aviator suit.

It is one of the special aims of these G-protective trousers not to have to provide a tailor-made piece of clothing for every pilot, but to get along with a single G-protective trousers within a size category of wearers. The pressurization by means of these specific, muscle-acting fans presented also serves this purpose.

The main valve for the compressed air supply is also a safety valve. This immediately closes the compartments from the outside world as soon as the cabin pressure collapses for any reason, or the pressure supply from the aircraft fails.

At such a moment, the protective G-trousers act like a pressure suit and keep the pressure conditions stable within uncritical limits. Over these G-protective trousers according to the invention, conventional, approved aviator suits (overalls) can be worn, if necessary with additional functions for protection against influences of nuclear fallout, biological and chemical warfare agents and/or cold water. The G protective trousers can also be equipped with a Dry Air Cooling System for even more comfort in extremely hot climates.

Thanks to the exclusive, very little stretchable textile material, which is also very breathable and air-permeable, the amount of air required to build up pressure with these G protective trousers could be greatly reduced and accordingly the pressure build-up and pressure reduction is much faster than for any other G-Protective trousers. For the first time, these G-protective trousers are as easy to put on as ordinary jeans. Although no tight adaptation to a specific body constitution is necessary, these G-protective trousers can offer effective G-protection for clothes up to two sizes higher. No lacing is required to achieve a tight fit on the body. Despite the fact that no lacing, straps or buckles have to be operated for individual adjustment, no pressure reduction has to be accepted and no loss of time when building up pressure due to otherwise stretching laces and straps for size adaptation.

These protective G-trousers can also apply pressure to the buttocks without the air-cushion effect that is accepted there, thanks to the tension around the buttocks area generated by the pneumatic muscles. The G-protection is thus achieved compared to that achieved with conventional full-print G-trousers, which work with full-surface printing with bubbles, but without printing on the bottom. Also unique is the fact that these protective G-trousers can be worn with the trouser legs tucked into the boots, as shown in FIGS. 20 and 21. This means that foot pain under G-load can be effectively avoided. A non-return valve between the compartments 5, 13, 17, 18, 25, 34, 35 and the outside of the protective G-trousers can be installed, which closes in the event of a sudden loss of pressure in the aircraft and/or in the cockpit atmosphere and thus maintains the pressure in the compartments. Another built-in valve can be activated by immersion in water by means of a moisture sensor so that the compartments then retain their air content and generate buoyancy accordingly.

A particularly interesting version of these protective G-trousers is shown in FIGS. 22 to 34. In this example, as shown in FIG. 22, the G-protective trousers are worn directly on the body, something that was never possible before, and for which only specially adapted, fire-resistant, wafer-thin and air-permeable textile underwear is worn. On the thighs of the trouser legs, pockets 28 with viewing windows 29 and lower flaps 42, which can be closed with a zipper or Velcro, are sewn along their outer and upper sides by means of zippers or Velcro fasteners, while the other, the inner and lower sides of the pockets, are sewn on by means of Velcro strips cling to the pant legs. Zippers 37 run from the lower edge of the trouser legs upwards on their front, under the patch pockets 28 up to almost the level of the crotch 10. This arrangement of the zippers 37 is only possible because these areas on the front and back of the trouser legs do not have any bladders or compartments. To put it on, the primary zipper 36 on the waistband is opened and the trousers are put on. The wide opening of the zippers 37 along the trouser legs allows the G-protective trousers to be put on and taken off quickly. But it also offers the possibility that the wearers can put on the G-protective trousers with their already donned aviator suit and with their already donned aviator boots over the aviator boots and over the aviator suit and at the end, just the primary zipper 36 and the one running along the trouser legs zippers 37 must be closed. The second zip fastener 38 on the waistband is used to widen the waist, if a pilot has gained a bit of waist circumference over time. After the zippers 36, 37 have been closed, the G protective trousers are ready for use for connection to the compressed air supply in the cockpit. In reverse order, undressing is also very quick. This stepping into the trousers and getting out of the trousers again is therefore possible in a few seconds in a way that has never been possible, not even remotely, with other protective G-trousers. Until now, a G protective suit has always been difficult to put on and never quickly put on and taken off, and certainly not like jeans over the aviator suit and the aviator boots.

FIG. 23 shows these G protective trousers with open zippers 37 along the two lower legs in the pulled-on state, seen from behind. On the side of the lower legs of the trouser legs, two Velcro strips 39 can be seen so that additional pockets can be attached there if necessary.

FIG. 24 shows these G-protective trousers with the zipper 37 fully opened on the right trouser leg, when worn over the naked body or leg. As one can see, the zipper 37 extends almost up to the height of the crotch 10 of the protective G-trousers. To open and close the zipper 37, the overlying pocket 28 is folded away outwards as shown over the right thigh and then pressed onto the Velcro tape 28 again by means of its Velcro fasteners. In an additional embodiment, not shown, which makes it possible to position other pockets or tactical equipment on the thigh, the zipper 37 is positioned on the inside of the trouser leg, almost up to the level of the crotch of the G-protective trousers.

FIG. 25 shows these G protective trousers with the zipper 37 fully opened over the left leg and the pocket 28 folded outwards. On the underside of the pocket 28, the Velcro strips 38 can be seen, with which the pocket 28 can be pressed onto the Velcro strip 38 on the trouser leg when the zipper 37 is closed. In FIG. 26, these protective G-trousers are shown fully open with pockets 28 folded outwards and two zippers 37 on the front of the legs.

FIG. 27 shows these G protective trousers worn over the bare body, with zippers 37 closed. The trouser legs are full and right next to the legs and the G-protective trousers are always ready to go into action. Due to their tight but comfortable cut, their fit and their very air-permeable fabric, in contrast to all other very voluminous G-suit trousers and their non-air-permeable fabrics, a pilot can leave these G-protective trousers fully on even during longer breaks or interruptions on the ground, or in addition, he can still open the zippers 37 for cooling, which makes the G-protective trousers even further comfortable to wear during breaks. It is then hardly noticed by the wearer. In FIG. 28, the same G protective trousers are shown in a view on the right side, and in FIG. 29 in a view on the left side. Here one can still see the supply hose 33 for the compressed air. In FIG. 30 these G protective trousers with opened zippers 37 are shown with their back lying loosely on the floor, and in FIG. 31 one sees these G protective trousers with opened zippers 37 with their front lying loosely on the floor.

In order to show that these protective G-trousers can also be worn over a flight suit, this is shown in FIG. 32. The zipper 37 in front of the lower leg of the wearer's right leg is open here and reveals the fins of the aviator suit worn underneath. In FIG. 33 one can see how the G protective trousers are presented over the aviator suit with closed zippers 37.

Finally, FIG. 34 shows the G protective trousers worn by a pilot in full gear, namely over his aviator suit and over his pilot's boots, so that the trouser legs of the G protective trousers end up on the shoes or boots like those of conventional trousers. The zippers 37 run here on the front of the trouser legs from below, and they could lead up to the groin, where they run under the pockets 28, which can be folded away to one side for this purpose and by means of Velcro in the position shown here being held. An alternative trousers model can also be implemented without fixed pockets, whereby the pockets are then only attached to the G-protective trousers with Velcro fasteners, with which the pilot can adapt the choice of the bag that is currently being used to the daily mission. With these protective G trousers, the pilot is ready at any time from the state as shown in FIG. 34 to climb into the aircraft cockpit and take off and climb up for an operation.

In principle, these G protective trousers can either be worn under an aviator suit and in the boots, or as a special feature over the aviator suit and over the aviator boots, which is particularly comfortable for the wearer, because then he can put off these G protective trousers for operational interruptions and he can quickly put them on again just as quickly if necessary and get ready for the next operation within seconds. If the G-protective trousers are to be worn directly on the body, with only very light underwear, it is advantageous to cut them a little tighter and more form-fitting than for use over an aviator suit. In the latter case, the G-protective trousers are cut relatively wide in order to compensate for the amount of fabric applied to the aviator suit.

As far as the care of these G-protective trousers is concerned, it should be mentioned that they are very easy to wash and therefore easy to keep clean. It can be washed in a conventional washing machine. The particularly light fabric, weighing a mere 121±5 grams/square meter, proves to be dirt and stain-resistant and is therefore very easy to wash, even if it is badly soiled with oil or kerosene. The G-protective trousers as presented are suitable for military and civil flight operations, especially for acrobatic flights. It is suitable for both western and eastern aircraft platforms, i.e. for every aircraft platform used. Only the connectors for pressurization have to be changed or adapted depending on the aircraft platform.

INDEX OF NUMERALS

1 Compartments
2 Airtight layer
3 Belt loops
4 Trousers material
5 Coccyx canal
6 Corners of the compartment
7 Textile strips
8 Waistband
9 Trouser hems
10 Crotch of trousers
11 Lower edge of the bar
12 Outer side of the trousers
13 Sack-like bag as a bladder
14 Pieces of textile on the front of the trouser legs, free of pockets
15 Pieces of textile on the back of the trouser legs, free of pockets
16 Small of the back area
17 Connection channel
18 Inguinal canals
19 Lip openings
20 Indentation in the knee area
21 Ventilation veins with lip opening
22 Supply hose
23 Pilot trousers
24 Raccord
25 Buttocks compartments that cover the buttocks half
26 Bladders of the 5 bladder G protective trousers
27 Hose for the bladders 26
28 Thigh pockets
29 Viewing window in thigh pockets
30 Bladder in full coverage G-protective trousers
31 Column, not covered by bladder
32 lateral hip areas
33 Pressure hose full coverage G-protective trousers
34 Compartments for the outside of the trouser legs
35 Compartments for the inside of the trouser legs
36 Zippers to close the waistband
37 Zipper along the trouser legs
38 Second zipper to widen the waist of the G protective trousers
39 Velcro strips on the outside of the lower legs of the trouser legs
40 Recesses on the conventional G protective suit
41 Zippers on the back of the lower legs of the trouser legs
42 with zip or Velcro closable flap on pocket 28

The invention claimed is:

1. Acceleration protective trousers for pilots of aircraft in which high accelerations occur, wherein the acceleration protective trousers are made of a synthetic textile material that is air-permeable, tear-resistant, fire-resistant, and low-stretch, the acceleration protective trousers comprising:
at least parts of the textile material of the acceleration protective trousers being double-walled and thus airtight compartments being formed along an inside and/or outside of the textile material, which can be subjected to acceleration-dependent air pressures, whereby the airtight compartments are provided in particular locations and are operable to be inflated into an approximately circular cross-section by inflation via an outwardly leading hose with raccord for connection to an automatically meterable compressed-air supply, so that the airtight compartments act as muscles in that their two opposite edges can be pulled together and adjacent pieces of the textile material of the acceleration protective trousers can be stretched therewith,
wherein the airtight compartments extend continuously along the inside and/or outside of the textile material of trouser sections configured to cover legs of a wearer and are each connected at upper ends of the trouser sections to a groin channel extending along a lower region configured to cover a groin of the wearer and the airtight compartments on outer sides of the trouser sections to cover the legs of the wearer extend further upwards from the trouser sections to cover the groin of the wearer and each terminate in a bag-like bladder towards a portion of the acceleration trousers configured to be around a lower abdomen of the wearer, while on a rear side of the acceleration trousers, in a small back section of the acceleration trousers configured to cover a small of a back of the wearer, the bag-like bladders communicate with one another via a connecting channel and from this one a coccyx channel branches off downwards and extends along the acceleration trousers to cover a region between buttocks cheeks of the wearer in a direction of a crotch of the wearer, and whereby the airtight compartments communicate via the outwardly leading hose with the raccord with the automatically meterable compressed air supply.

2. The acceleration protective trousers according to claim 1, wherein the airtight compartments are lined on the inside of the textile material with an airtight elastomeric rubber material so that they can be inflated into an approximately circular cross-section are and then act as muscles which pull together their two opposite edges and thus adjacent pieces of the textile material is operable to be stretched therewith.

3. The acceleration protective trousers according to claim 1, wherein the airtight compartments are traversed by an elastically stretchable, loose, elastomer air hose, through which they can be inflated into an approximately circular cross-section so that the airtight compartments act as muscles which pull together their two opposite edges and thus adjacent pieces of the textile material.

4. The acceleration protective trousers according to claim 1, wherein the textile material consists of fully synthetic, antistatic, hard-wearing and low-stretch yarn mixtures with aramid fibers with a weight per unit area of at most 130 grams/m2, with an air permeability according to DIN EN ISO 9237 of up to 500l/m2×s min and a tensile strength according to ISO 13934-1 of up to 2000 N/5 cm.

5. The acceleration protective trousers according to claim 1, wherein the trouser sections of the acceleration protective trousers configured to cover the legs of the wearer are each provided with a zipper on a front of the trouser sections, which can be opened from bottom of the trouser sections to top of the trouser sections and closed from the top to the bottom of the trouser sections, so that the trouser sections configured to cover the legs of the wearer can be opened almost to the groin of the wearer and thus the acceleration protective trousers can be donned over an aviator's suit worn by the wearer and over aviator boots donned by the wearer with the zippers open and can be worn properly after the zippers have been closed, and can be put off after the zippers have been opened over the aviator boots.

6. The acceleration protective trousers according to claim 1, wherein the trouser sections configured to cover the legs the wearer are each provided with a zipper on their inside, which can be opened from bottom to top of the trouser sections and closed from top to bottom of the trouser sections, for releasing a front of the trouser sections for positioning pockets or tactical equipment, wherein when the trouser sections are separated by the zippers provided on the trouser sections, the trouser sections can be opened almost to the groin of the wearer and thus the acceleration protective trousers can be put on over an aviator suit worn by the wearer and over aviator boots donned by the wearer when the zippers are open and can be worn properly after closing the zippers and can be put off again after opening the zippers over the aviator boots.

7. The acceleration protective trousers according to claim 1, wherein one of the airtight compartments configured to act as a contracting muscle extends in a form of a channel from a vicinity of a waistband of the acceleration protective trousers laterally on the outside of the textile material down to trouser hems, and a similar airtight compartment of the airtight compartments each extends along the inside of the textile material of the trouser sections configured to cover the legs of the wearer from the crotch of the wearer to the trouser hems, and the one and the similar airtight compartment of the airtight compartments are connected to outer airtight compartments at top of the acceleration protective trousers via a respective inguinal channel, with single-layer, so that thin and air-permeable and continuous textile strips remain free on a front and a back of the trouser sections, and front strips of the textile strips being divisible over their entire length by a zipper.

8. The acceleration protective trousers according to claim 1, wherein on each side of the acceleration protective trousers an airtight seat compartment is configured to extend from a side hip area of the wearer horizontally along a waistband of the acceleration protective trousers on a back of the acceleration protective trousers towards a cross area to cover to an outer half of the buttocks cheeks of the wearer, and the airtight compartments are connected with a connecting channel from which a coccyx channel with a width of 2 cm to 6 cm extends by at least 20 cm from a center of a back of the waistband and extends downwards, for acting with pressure on the airtight compartments to cover the buttocks cheeks of the wearer, but without a dangerous air cushion effect in an event of an ejector seat actuation.

9. The acceleration protective trousers according to claim 1, wherein the airtight compartments on the outer sides of the trouser sections, extend at a hip level of the wearer into a sack-like pocket as a bladder which extends to a front center part of the acceleration protective trousers for covering a front side of a lower abdomen of the wearer for building the bladder each to act on the lower abdomen of the wearer in an inflated state.

10. The acceleration protective trousers according to claim 1, wherein the airtight compartments are inflatable to extend over the buttock cheeks of the wearer, a lower abdomen area of the wearer below a waistband of the acceleration protective trousers as well as along the inside and/or outside of the textile material of the trouser sections configured to cover the legs and the groin of the wearer.

11. The acceleration protective trousers according to claim 1, wherein the acceleration protective trousers have ventilation veins which run along the airtight compartments on the outside of the textile material which is intended to lie opposite a body of the wearer, and that the ventilation veins have holes with closing lips, via which compressed air can be conveyed into an interior of the acceleration protective trousers in a finely dosed manner, for cooling a body surface of the wearer of the acceleration protective trousers.

12. The acceleration protective trousers according to claim 1, wherein a pocket with a viewing window is attached to each of a front of the trouser sections configured to cover front sides of thighs of the wearer, in that the pocket is sewn to the trouser sections along its outer and upper edge, while a lower and inner edge is only held by Velcro fasteners on the trouser sections, so that the pocket can be folded outwards to release a zipper arranged in the pocket and running below the pocket, and the pocket is equipped with a flap at its lower edge and the flap can be opened with a zipper or a hook and loop fastener.

13. The acceleration protective trousers according to claim 1, wherein a pocket with a viewing window is attached to a front of the trouser sections, in that this pocket is held on the trouser sections by means of hook and loop fasteners, and the pocket can be opened at its lower edge with a flap with a zipper or hook and loop fastener.

* * * * *